United States Patent
Wallace

(10) Patent No.: US 9,216,862 B2
(45) Date of Patent: Dec. 22, 2015

(54) NARROW BELT SORTER

(71) Applicant: Matthew Earl Wallace, West Olive, MI (US)

(72) Inventor: Matthew Earl Wallace, West Olive, MI (US)

(73) Assignee: TGW Systems, Inc., Spring Lake, MI (US)

( * ) Notice: Subject to any disclaimer, the term of this patent is extended or adjusted under 35 U.S.C. 154(b) by 189 days.

(21) Appl. No.: 13/965,678

(22) Filed: Aug. 13, 2013

(65) Prior Publication Data

US 2014/0041989 A1  Feb. 13, 2014

Related U.S. Application Data

(60) Provisional application No. 61/682,397, filed on Aug. 13, 2012.

(51) Int. Cl.
| | |
|---|---|
| *B65G 47/46* | (2006.01) |
| *B65G 47/54* | (2006.01) |
| *B65G 13/07* | (2006.01) |
| *B65G 13/071* | (2006.01) |

(52) U.S. Cl.
CPC ............... *B65G 47/54* (2013.01); *B65G 13/07* (2013.01); *B65G 13/071* (2013.01)

(58) Field of Classification Search
USPC ............... 198/369.1, 570, 586, 833, 370.01, 198/370.03, 370.06, 370.09, 371.1, 371.2, 198/371.3, 465.1, 457.02, 54, 575, 597, 198/688.1, 781.01
See application file for complete search history.

(56) References Cited

U.S. PATENT DOCUMENTS

| | | |
|---|---|---|
| 6,843,365 B2 | 1/2005 | Baker |
| 2002/0033318 A1 | 3/2002 | Veit et al. |
| 2002/0096417 A1 | 7/2002 | Veit et al. |
| 2002/0108839 A1 | 8/2002 | Baker et al. |
| 2002/0166752 A1 | 11/2002 | Takahashi |
| 2003/0168312 A1 | 9/2003 | Veit et al. |
| 2004/0089514 A1 | 5/2004 | Henson et al. |
| 2004/0108185 A1 | 6/2004 | Hishinuma |
| 2004/0112712 A1 | 6/2004 | Brooks et al. |
| 2004/0134752 A1 | 7/2004 | Miller et al. |
| 2004/0173436 A1 | 9/2004 | Baker |
| 2005/0133345 A1 | 6/2005 | Veit et al. |
| 2006/0060447 A1 | 3/2006 | Ramaker et al. |
| 2006/0070855 A1 | 4/2006 | Lemm |
| 2006/0115037 A1 | 6/2006 | Pedersen et al. |
| 2006/0219444 A1 | 10/2006 | Ruigrok |
| 2007/0007108 A1 | 1/2007 | Veit et al. |
| 2009/0057100 A1 | 3/2009 | Syndikus |
| 2012/0048677 A1 | 3/2012 | Ramankutty et al. |

*Primary Examiner* — Gene Crawford
*Assistant Examiner* — Lester Rushin
(74) *Attorney, Agent, or Firm* — Dickinson Wright PLLC

(57) ABSTRACT

A material handling system including a sorter that uses compressed air and drive from the narrow belts to cause articles or loads to change from one conveyor segment to an adjacent segment.

38 Claims, 19 Drawing Sheets

NARROW BELT SORTER

CROSS REFERENCE TO RELATED APPLICATION

This U.S. Utility Patent Application claims the benefit of U.S. Provisional Application Ser. No. 61/682,397 filed Aug. 13, 2012, the entire disclosure of the application being considered part of the disclosure of this application and hereby incorporated by reference.

BACKGROUND OF THE INVENTION

1. Technical Field

The present invention generally relates to a material handling system and more particularly, to a narrow belt conveyor system including a cost effective sorter that allows articles or loads to change from one conveyor segment to an adjacent segment.

2. Related Art

Narrow belt conveyor systems use multiple, continuously moving parallel belts for conveying flat bottom objects or loads along conveyor segments, particularly straight runs. Narrow belt conveyor systems are often used in conjunction with accessories such as sorters, transfers, accumulators, and/ or diverters. The plurality of narrow belts and the spaces between the belts allow a sorter to be placed within the frame of the relevant conveyor segment, and selectively extend upward between the plurality of narrow belts to change the direction of conveyed loads, such as to an adjacent conveyor segment. More specifically, such sorters typically move from a retracted position that is beneath the top surface of the conveyor belts to an extended position slightly above the top surface of the narrow belts so that the sorter may engage the underside of the loads to change their travel direction. Such narrow belt sorters may include rollers or wheels.

Narrow belt conveyors are popular because of their versatility. In particular, they allow easy modification of the placement of various sorters, accumulators, transfers, and/or diverters to suit an operator's changing need. More specifically, a sorter may be placed anywhere along the travel path of the narrow belts, specifically under the linear segment of the narrow belts. Therefore, the conveyor system may have an original position at an original transfer point and, if it is desirable to move the transfer point or reconfigure the potential travel paths by repositioning various conveyor segments, the sorter may be easily moved to a new transfer point. One major issue with moving narrow belt sorters is that the rollers and wheels of the narrow belt sorter typically require substantial amounts of power to move the loads at an angle relative to the primary conveyor segment. More specifically, the sorter must quickly rise to its desired height above the individual belts, and at the same time, the rollers must be quickly spun up to the desired speed to quickly shift the load to an adjacent conveyor segment. As used in this application, the term "primary segment" is the segment including the sorter, and the conveyor segments to which the sorter passes the various loads are referred to as "adjacent segments". A conveyor system may include multiple primary segments, and any adjacent segments, if it includes a sorter, may becoming the primary segment when the load is transferred from the primary to the subsequent adjacent segment. Some sorters may be configured to sort objects off either side of the primary conveyor segment, as illustrated in FIG. 1, which requires quick changes in the direction of rotation of the load rollers.

One major issue with sorters is the required quick increase in rotational speed of the load rollers and the change in rotational directions of the load rollers is power intensive. Most sorters require a 240 or a 480 volt electrical line to an electrical motor to drive the load rollers. Electrical motors capable of driving the load rollers are expensive, thereby raising the initial product cost. During installation, electrical power must be run to the location of each sorter, which is a major component of the installation costs. Installation of the required circuits, conduit lines and outlets is expensive, both from a material cost and additional time requirements to complete installation. In addition, if changes are needed to the conveyor system after installation, the costs of reconfiguring the outlet locations and the existing electrical lines is expensive. Therefore, while the sorter itself may be easily unbolted from the frame and moved to a new location, the relocating of the power supply is expensive and typically requires specialized expertise.

SUMMARY OF THE INVENTION

The present invention is generally directed to a material handling system capable of being easily reconfigured, and more particularly, to a narrow belt conveyor system having a sorter capable of easy configuration and lower installation costs, as well as being particularly suited to allow easy reconfiguration without the need to extend or change electrical power lines. More specifically, the sorter eliminates expensive electrical motors that normally drive the rotation of the rollers, and instead selectively uses the existing narrow belts of the primary conveyor segment to power the rotation of the load rollers. The rotation of the load rollers is powered by the passage of the narrow belts, specifically the return belt through the sorter, yet the sorter may easily be repositioned with the primary conveyor segment without disassembly and without removing the narrow belts.

The present invention is further directed to a sorter for a narrow belt conveyor system having at least one narrow belt including a return belt portion and a carrier belt portion. The sorter includes at least one of a plurality of rollers and a plurality of wheels, and at least one drive roller configured to be selectively driven by the return belt portion and thereby transfer drive to the at least one of a plurality of rollers and a plurality of wheels. At least one drive belt operationally couples the at least one drive roller to the at least one of the plurality or rollers and the plurality of wheels. More specifically, the at least one drive belt extends between the at least one drive roller and the at least one of the plurality of rollers and the plurality of wheels. As discussed below, a number of belts may be used with intervening rollers, such as the intermediary roller. At least one of a first drive belt extends between the at least one drive roller and the intermediary roller and an intermediary drive belt extends between the intermediary roller and the at least one of the plurality of rollers and the plurality of wheels.

The sorter may further including a pneumatic system having a moveable roller configured to move between at least a first position and a neutral position and wherein when the moveable roller is in the first position the at least one drive roller is configured to engage the return belt portion, and when the moveable roller is in the neutral position the at least one drive roller is free of engagement with the return belt portion. The at least one drive roller includes at least one upper drive roller and at least one lower drive roller. An inter-drive belt operationally couples the at least one upper drive roller and the at least one lower drive roller together to rotate in the same rotational direction. At least one of the at least one upper drive roller and the at least one lower drive roller is directly coupled to the at least one intermediary roller with a first drive belt. If an at least one intermediary roller is included, it is coupled to the at least one of the plurality of rollers and the plurality of wheels with at least one intermediary drive belt.

The sorter further includes a pneumatic system having a moveable roller configured to move between at least a first position, a neutral position, and a second position. The moveable roller is configured to move the return belt selectively into engagement with the at least one upper drive roller to move the at least one of a plurality of load rollers and a plurality of wheels in a first direction; between the rollers and free from engaging the at least one upper drive roller and the at least one lower drive roller in a neutral position and into engagement with the at least one lower drive roller to move the at least one of a plurality of load rollers and a plurality of wheels in a second direction and wherein the first direction is opposite the second direction. More specifically, the pneumatic system is capable of moving a moveable roller between a first position, a neutral position and a second position, and wherein the neutral position is between the first position and the second position and wherein the pneumatic system includes at least one pneumatic actuator. The at least one pneumatic actuator has a three position binary movement using a fixed cylinder at an opposing end from a pivotable cylinder and wherein each of the fixed cylinder and the pivotable cylinder are capable of moving between a retracted position and an extended position. The fixed cylinder is fixedly secured to the sorter and the pivotable cylinder is operationally coupled to the moveable roller to move the moveable roller between the first position, the neutral position and the second position. In the first position both of the fixed and pivotable cylinders are in the retracted position, in the neutral position one of the fixed and pivotable cylinders is in the retracted position and the other of the fixed and pivotable cylinders is extended and in the second position both of the pivotable and fixed cylinders are in the extended position. The pneumatic system further includes, in addition to the pneumatic actuator, a cam and each of the pneumatic actuator and the moveable roller are coupled to the cam, with the pneumatic actuator moving the cam to in turn move the moveable roller in an arcuate motion.

The sorter may include a neutral roller wherein in the first position the neutral roller does not engage the return belt and the return belt engages only one of the at least one upper drive roller and the at least one lower drive roller. The moveable drive roller engages the return belt and wherein each of the at least one upper drive roller and at least one lower drive roller do not engage the return belt. More specifically, only one of the at least one upper drive roller and at least one lower drive roller can engage the return belt at a time, as the return belt moves them in opposite directions, and they are tied together for simultaneous rotation. As such, in the second position the return belt engages the moveable roller and one of the at least one upper drive roller and the at least one lower drive roller.

The present invention is directed to a narrow belt conveyor system for carrying loads. The system includes at least one narrow belt having a return belt portion and a carrier belt portion and a sorter. The return belt portion passes through the sorter to drive the sorter to be able to sort packages off of the primary conveyor segment to adjacent segments. The sorter includes at least one drive roller, a moveable roller configured to move the return belt portion in and out of engagement with the at least one drive roller, at least one of a plurality of rollers and a plurality of wheels, and at least one drive belt operationally coupling the at least one drive roller to the at least one of the plurality or rollers and the plurality of wheels. The at least one upper drive roller is positioned opposite the at least one lower drive roller with the return belt extending therebetween.

The at least one drive belt extends between the at least one drive roller and the at least one of the plurality of rollers and the plurality of wheels. The sorter includes an intermediary roller. The at least one drive belt includes at least one of a first drive belt extending between the at least one drive roller and the intermediary roller and an intermediary drive belt extending between the intermediary roller and the at least one of the plurality of rollers and the plurality of wheels.

The at least one drive roller includes at least one upper drive roller and at least one lower drive roller. More specifically, the sorter further includes at least one intermediary roller and the at least one of the at least one upper drive roller and the at least one lower drive roller is directly coupled to the at least one intermediary roller with a first drive belt. As configured, at least one of the at least one upper drive roller and the at least one lower drive roller is not directly coupled to the intermediary roller. In addition, the at least one upper drive roller and the at least one lower drive roller are directly coupled with a second drive belt. Further, the at least one intermediary roller is coupled to the at least one of the plurality of rollers and the plurality of wheels.

The sorter includes a moveable roller is configured to move the return belt selectively into engagement with the at least one upper drive roller to move the at least one of the plurality of load rollers and the plurality of wheels in a first direction; between the rollers and free from engaging the at least one upper drive roller and the at least one lower drive roller in a neutral position; and into engagement with the at least one lower drive roller to move the at least one of the plurality of load rollers and the plurality of wheels in a second direction and wherein the first direction is opposite the second direction.

In addition, the at least one of a plurality of load rollers and a plurality of wheels, and the intermediary roller are located on opposite sides of the at least one upper drive roller and the at least one lower drive roller.

The sorter includes a pneumatic system capable of moving the moveable roller between a first position, a neutral position and a second position, and wherein the neutral position is between the first position and the second position. The pneumatic system includes a pneumatic actuator having fixed cylinder at an opposing end from a pivotable cylinder and wherein each of the fixed cylinder and the pivotable cylinder are capable of moving between a retracted position and an extended position and wherein in the first position both of the fixed and pivotable cylinders are in the retracted position, in the neutral position one of the fixed and pivotable cylinders is in the retracted position and the other of the fixed and pivotable cylinders is in the extended position and in the second position both of the pivotable and fixed cylinders are in the extended position. The pneumatic system in addition to a pneumatic actuator includes a cam and wherein each of the pneumatic actuator and the moveable roller are coupled to the cam. The moveable roller is configured to move between a first position, a neutral position and a second position. In the first position the moveable roller does not engage the return belt and the return belt engages only one of the at least one upper drive roller and the at least one lower drive roller. In the neutral position the moveable drive roller engages the return belt and wherein each of the at least one upper drive roller and at least one lower drive roller do not engage the return belt. In the second position the return belt engage the moveable roller and one of the at least one upper drive roller and the at least one lower drive roller.

The carrier belt portion passes over the sorter and the sorter is configured to extend between a retracted position and an extended position and in the retracted position the at least one of the plurality of rollers and the plurality of wheels is below the carrier belt portion and in the extended position, the at least one of the plurality of rollers and the plurality of wheels is at least partially above the carrier belts such that the load engages the at least one of the plurality of rollers and the plurality of wheels and not the carrier belt portion.

The present invention is also directed to a sorter for a narrow belt conveyor system having at least one narrow belt including a return belt portion and a carrier belt portion. The sorter includes at least one of a plurality of rollers and a plurality of wheels, at least upper drive roller and at least one lower drive roller and wherein each the at least one upper drive roller and the at least one lower drive roller is configured to be selectively driven by the return belt portion and wherein the at least one upper roller engaging the return belt portion rotates the at least one of the plurality of rollers and the plurality of wheels in a first direction and the at least one lower drive roller engaging the return belt portion rotates the at least one of the plurality of rollers and the plurality of wheels in a second direction and wherein the first and second directions are opposite, and wherein the sorter is configured to rotate the at least one of a plurality of rollers and a plurality of wheels in the first direction and the second direction without the use of electrical motors in the sorter; and at least one drive belt operationally coupling the at least one drive roller to the at least one of the plurality or rollers and the plurality of wheels.

The sorter further includes a pneumatic system and a moveable roller and wherein the pneumatic system is configured to move the moveable roller to position the return belt portion in and out of engagement with each of the at least one upper drive roller and the at least one lower drive roller, and wherein when the moveable roller is in a first position the at least one of a plurality of rollers and a plurality of wheels rotates in the second direction and when the moveable roller is in a second position, the at least one of a plurality of rollers and a plurality of wheels rotates in the second direction and wherein the moveable roller also includes a neutral position between the first position and the second position, and a pneumatic system configured to move the moveable roller.

DETAILED DESCRIPTION OF THE PREFERRED EMBODIMENT

Figure 1:
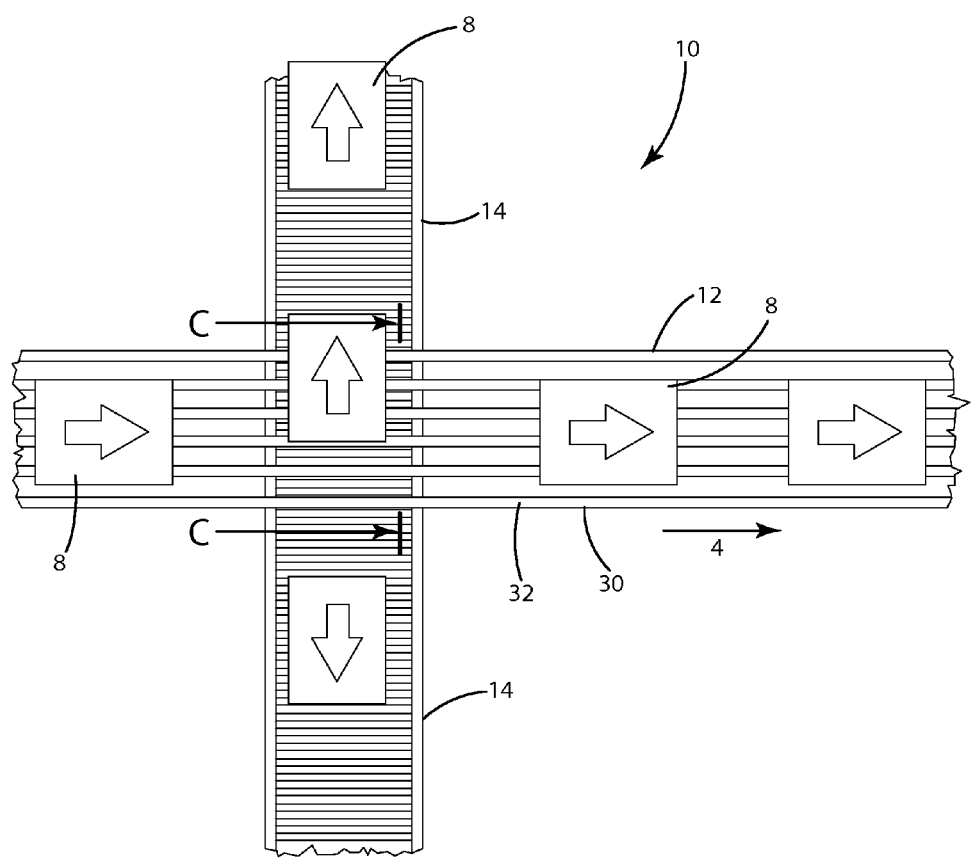
FIG. 1 is a top view of an exemplary conveyor system including a sorter.

The conveyor system 10 of the present invention may be made in practically any desired configuration by combining straight run segments, curved segments, and any other desirable segments in a variety of configurations with various sorters, accumulators, transfers and/or diverters as desired by the needs of the user. As illustrated in FIG. 1, a primary straight segment 12 is supported by a frame and has a plurality of narrow belts 30 propelling loads 8 in a first direction 4 along the primary segment 12. The narrow belts 30 are generally endless belts and include a carrier belt portion 32, which supports and conveys the load 8, and a return belt portion 34. The return belt portion 34 generally travels in the opposite direction as the carrier belt portion 32 and is located under the carrier belt portion 32 and between the frame 20 of the primary conveyor segment 12.

Figure 2:
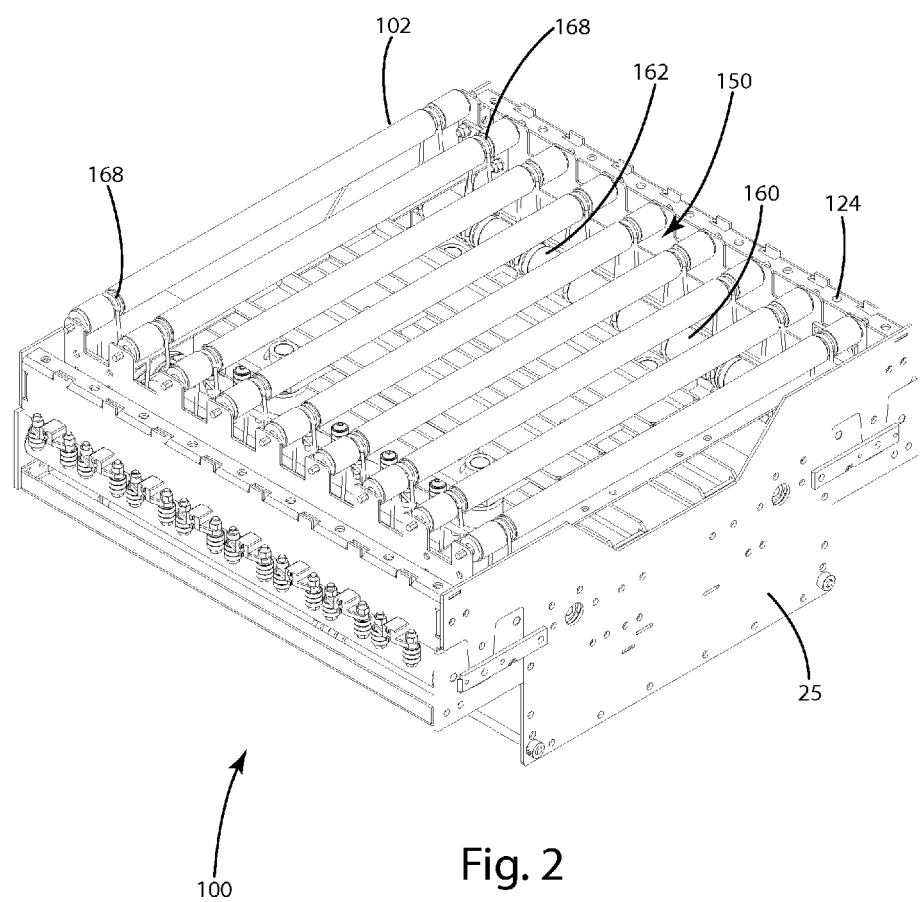
FIG. 2 is a perspective view of the sorter.
Figure 21:
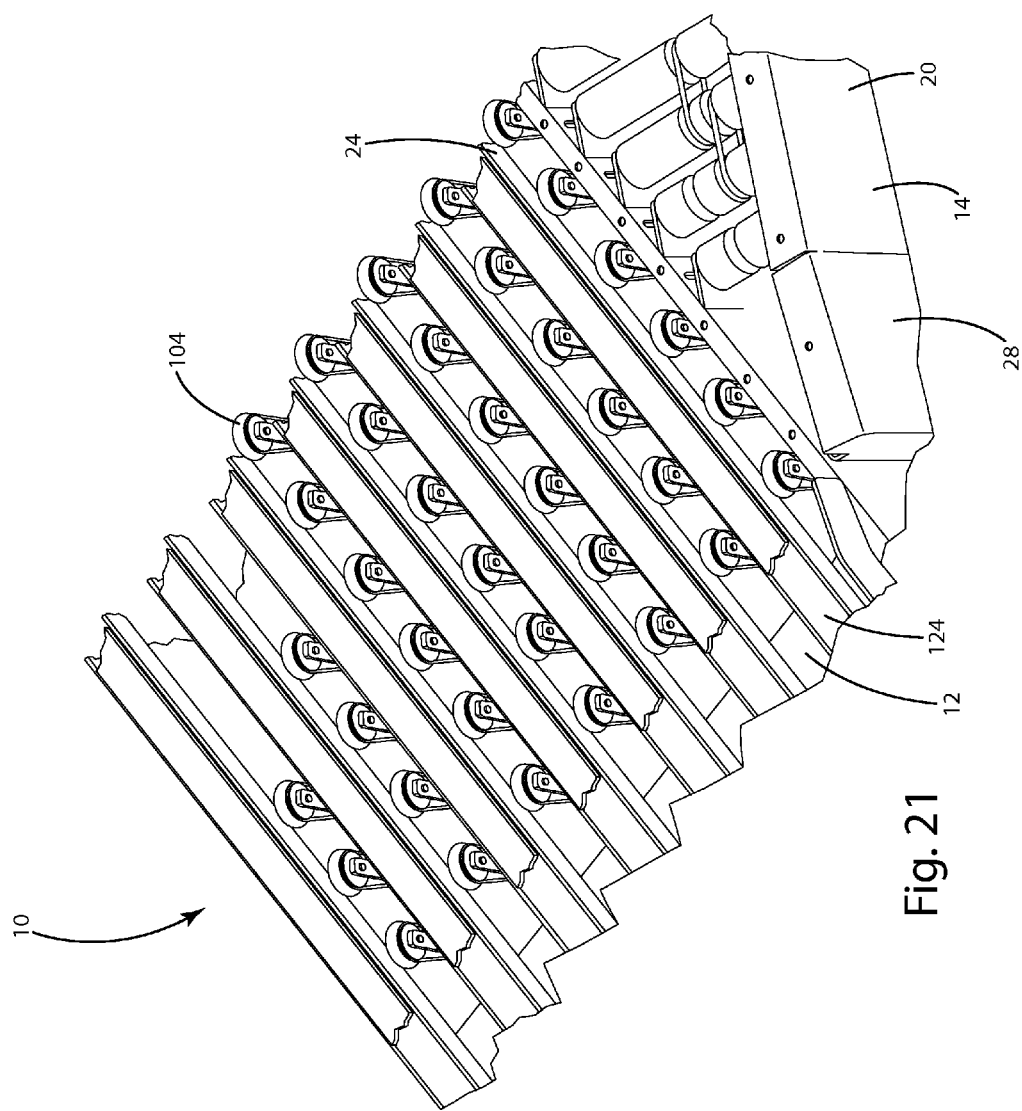
FIG. 21 is a top perspective view of a sorter including drive wheels in place of rollers.

A sorter 100 is generally located at the intersection of the primary conveyor segment 12 with an adjacent conveyor segment 14, such as the two adjacent segments in FIG. 1, which may sort the loads in either direction as desired. While the sorter 100 is illustrated in FIG. 2 as including a plurality of rollers 102, it may be possible that the sorter may instead include a plurality of wheels 104 in place of the rollers; as illustrated in FIG. 21. The wheels would allow the primary segment to be joined by angled segments, other than just the illustrated 90° adjacent segments 14, relative to the primary conveyor segment 12. In the illustrated embodiment, the primary conveyor segment 12 includes eight narrow belts 30, each approximately 2 inches wide. It will be appreciated, however, that the width of the individual narrow belts 30, the spacing of the narrow belts 30, and the number of narrow belts 30 on the primary segment 12 may depend upon the desired application and other design considerations.

Figure 9:
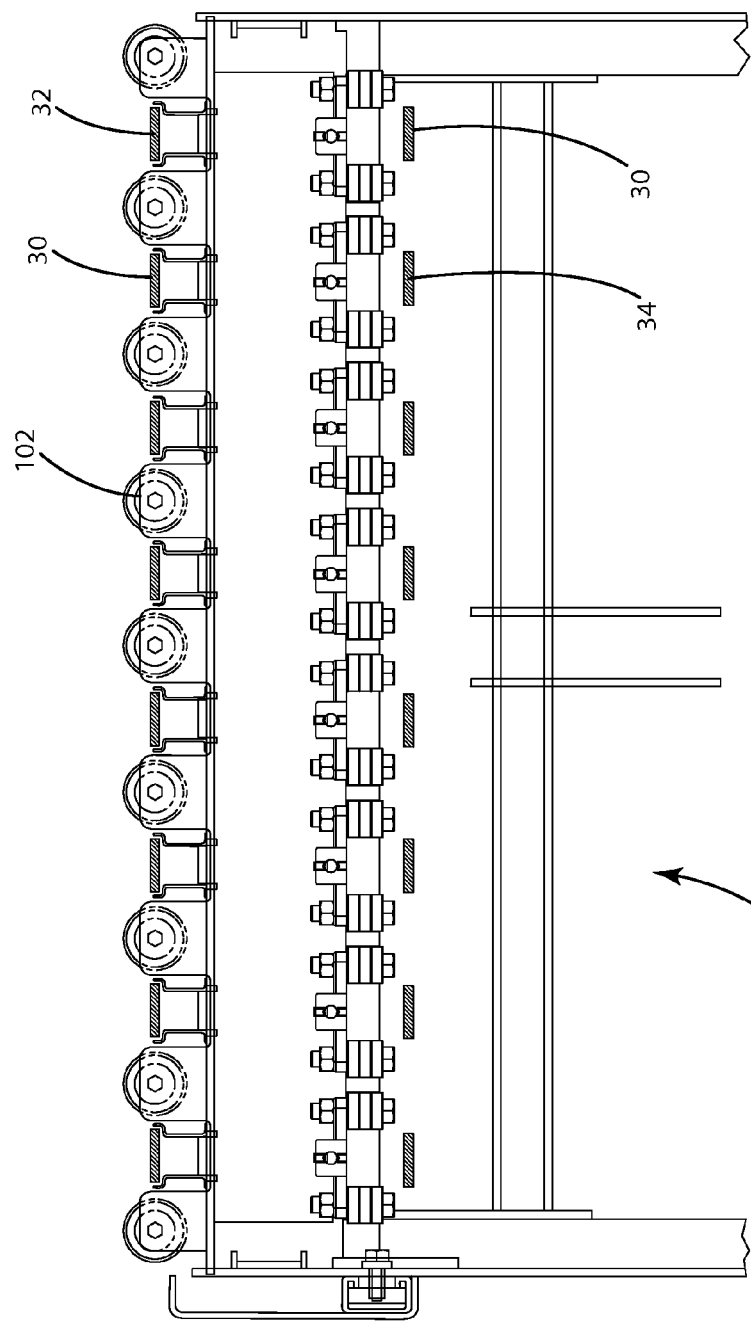
FIG. 9 is a sectional view of the conveyor system and sorter along line C-C in FIG. 1.

As further illustrated in FIG. 21, the primary conveyor segment 12 generally includes a frame 20 having legs (not shown). The frame 20 may be funned or assembled in a variety of sizes, shapes, and configurations, so long as it is capable of supporting the sorter 100 and the narrow belts 30. As illustrated in FIGS. 9 and 21, the frame 20 may include a number of narrow belt support 124 on which the carrier belt portion 32 of the narrow belts 30 travels. The sorter 100 is fastened to the conveyor frame 20 with a sorter support fastener (not shown). The sorter support fastener is configured for easy adjustment, such that by loosening the fastener mechanism, the sorter 100 may be slid longitudinally along the frame 20 to a desired point. In addition, minor adjustments in position may be easily made. More specifically, the conveyor side frames 28 are illustrated as having an elongated U-channel (not shown) along their length, such that the sorter support fastener may use a slide plate (not shown) in the U-channel to allow for the sorter 100 to be precisely located in a desired position along the length of the segment, merely by sliding in the channels. The sorter 100 may be moved to the desired locations without removing it from the conveyor frame 20, allowing for easy and low cost installation and reconfiguration of the conveyor system 100. Once in the desired location, the sorter 100 may be secured in the desired location.

As discussed in the Background of the Invention, the use of sorters with narrow belt conveyors is common; however, each sorter currently needs a powerful electrical motor to drive the load rollers in the desired direction to move the load in a timely fashion from the primary segment 12 to an adjacent segment 14. As such, even while the sorter could easily be slid to a desired position, or moved allowing for easy reconfiguration, the sorter's requirement for electrical power, typically a 480 volt input line, requires significant reconfiguration of the electrical system, unless an outlet already exists at the new location. More specifically, if the sorter was slid, for example, 5 feet in one direction, an electrician would be called to add a junction box at the old outlet and extend the electrical wires through conduit to a new outlet box proximate to the new location of the sorter. This prevented most operators of conveyor systems from easily reconfiguring or making minor changes to their conveyor systems without specialized expertise. In addition, even during installation of a new conveyor system, a major cost of the system was the provision of power to the various sorter devices. Therefore, current sorters with their electrical power requirements lack flexibility, even if they are capable of easy movement relative to the frame of the conveyor segment.

The present invention is generally directed to a sorter 100 for use in a narrow belt conveyor system 10 that eliminates costly electrical motors as well as the need to run electrical lines to the sorter 100, such as 240 or 480 volt electric lines. Instead, the sorter 100 of the present invention only needs pneumatic air supplied to the sorter 100. Pneumatic air lines 40 are already usually supplied through flexible polyethylene tubes under the conveyor 10, thereby lowering material costs and installation costs. Many sorters 100 already have pneumatic air supplied to drive the sorter 100 from the recessed position between the narrow belts 30 to an extended position where it would engage the load 8. The present invention uses this compressed air to drive a pneumatic system 110 which places the sorter in opposing engagement with the return segments or return belt of the narrow belts, and as such replaces the expensive motors. The pneumatic system 110 does not directly spin the rollers 102 using compressed air, but instead simply moves a drive mechanism 150 to selectively engage either side 33, 35 of the return belt portion 34 of the narrow belts 30, thereby allowing the load rollers 102 to rotate in the desired direction. As such, the drive mechanism 150 uses the power freely available from the traveling individual narrow belts 30 to power the load rollers 102.

While no electric lines need to be run to the sorter 100 to drive electric motors, it is expected that at least low voltage control wires will be run to the sorter 100. These control wires are typically easily run alongside the frame 20 of the relative conveyor segment 12, and do not have the same requirements as the electrical lines traditionally used to power the motors in the sorters. These control wires are used to synchronize the sorter 100 with the rest of the system 10, and specifically are used to control the timing for the sorter 100: to extend from the retracted position to the extended position as illustrated in FIGS. 11-14, from the extended position as illustrated in FIGS. 11-14 to the retracted position, and the pneumatic system in determining when and in what direction to rotate the load rollers 102 by selecting which drive roller 160 engages the return belt portion 34 of the narrow belts 30. Of course, pneumatic lines need to be supplied to the sorter.

As the main conveyor segment 12 in which the sorter 100 is located already has carrier belt segments 32 and a return belt segments 34 forming the endless narrow belt loops 30, and because the sorter 100 only needs to operate when the main conveyor segment 12 is in operation, the present invention uses the freely available drive power from the narrow belts 30. In particular, the return belt segments or portions 34 are used to drive the load rollers in place of electrical motors. The main drive for the narrow belts 30 is typically capable, without modification, of powering numerous additional devices. However, in certain circumstances it may be necessary to modify the main drive. The return belt portions 34 only travel in one direction, but the present invention provides a reversible directional drive to the load rollers.

An exemplary sorter 100 including the present invention is illustrated in FIG. 2 in a perspective view. The sorter 100 is illustrated as not being installed in the conveyor segment 12 to illustrate the individual components without various belts or frame members 20 of the primary conveyor segment 12 obstructing the view. The load rollers 102 are connected to a drive roller 160 with an O-ring drive belt 168. The load rollers 102 are generally aligned with the narrow belts 30 and drive the loads 8 in a direction perpendicular to the drive direction of the narrow belts 30. As stated above, the individual load rollers 102 could, in some configurations, be replaced with a plurality of wheels 104 driven in a similar manner such as illustrated in FIG. 21, such as each row of wheels 104 being driven by a transverse roller (not illustrated), equivalent to the load rollers, which would drive the individual wheels above the transverse roller.

Although not illustrated, the sorter 100 includes a mechanism to raise and lower the sorter, such that the rollers move from a retracted position below the surface of the narrow belts 30 to an extended position above the surface of the narrow belts 30, as illustrated in FIG. 9 so that the load 8 solely engages the load rollers 102, and no longer engages the narrow belts 30.

Figure 3:
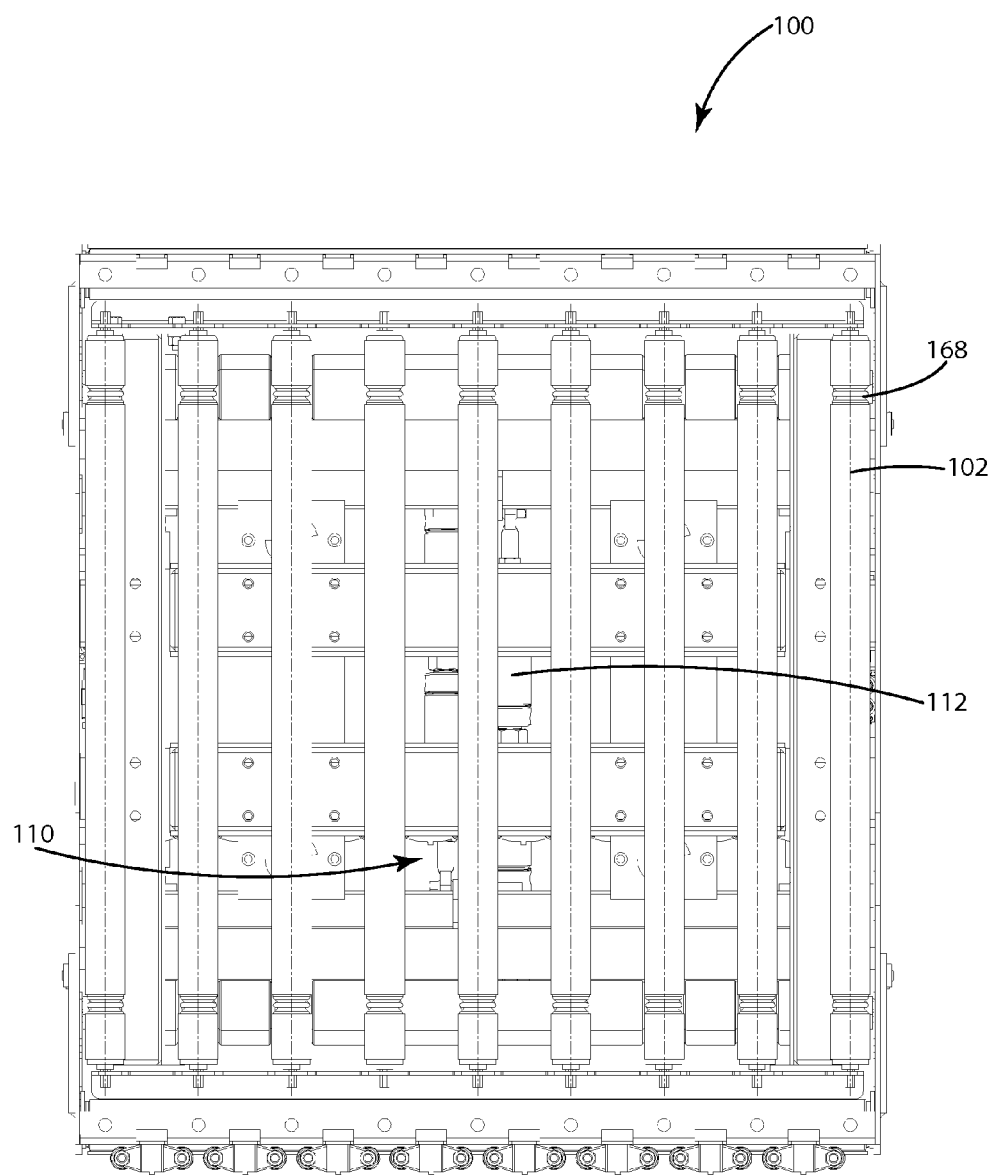
FIG. 3 is a top view of the sorter.
Figure 4:
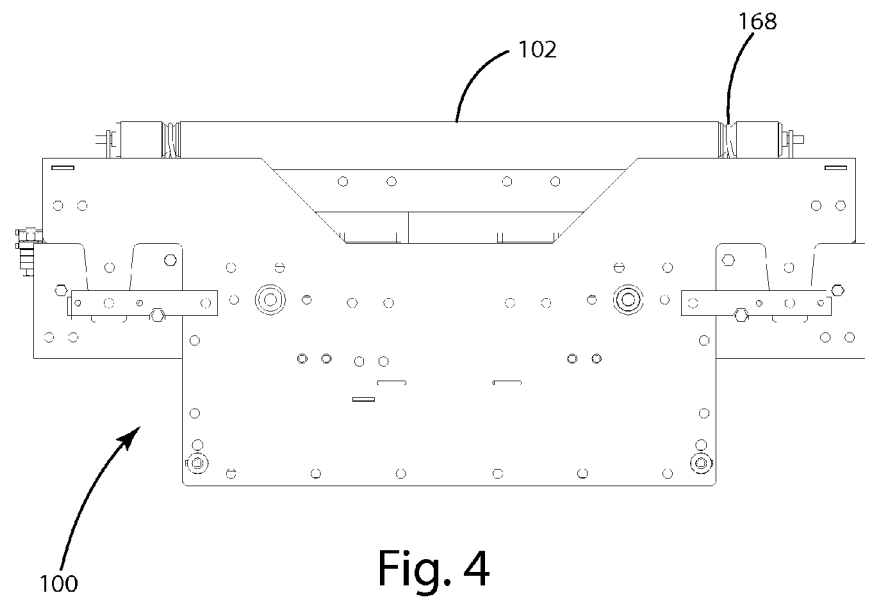
FIG. 4 is a front view of the sorter.
Figure 5:
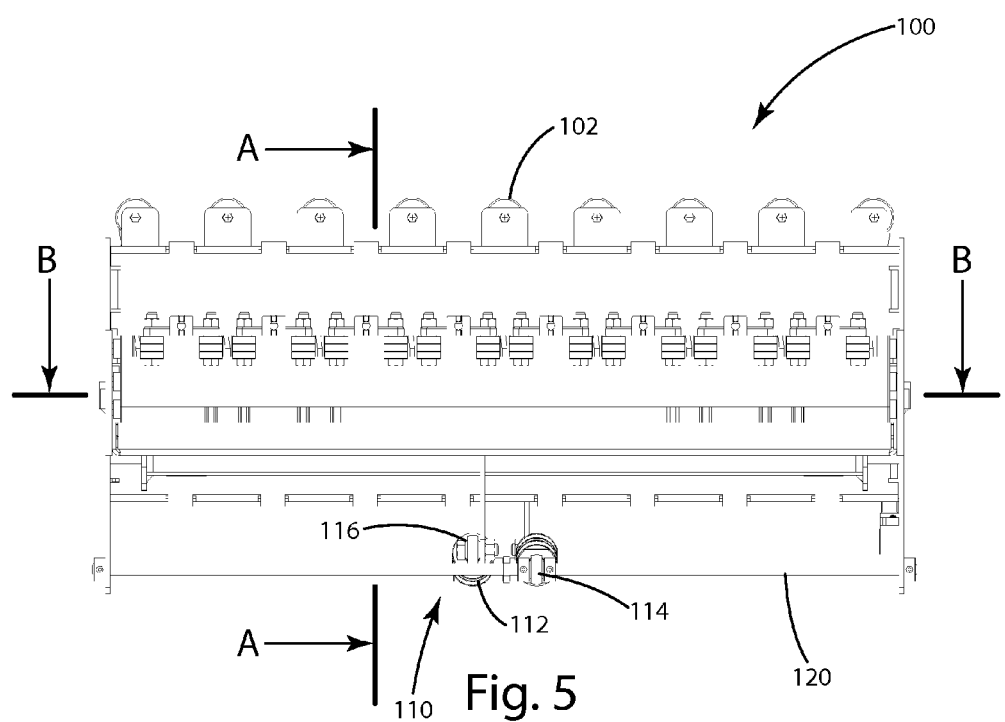
FIG. 5 is an end view of the sorter.

FIG. 3 illustrates a top view of the sorter. The pneumatic actuator of the pneumatic selection system 110 of the overall drive mechanism may also be seen in FIG. 3. The front view of the sorter 100 is illustrated in FIG. 4. The side view of the sorter 100 is illustrated in FIG. 5. The pneumatic actuators 112 are illustrated as extending from a support bar 120 (at the fixed end 114) to a cam 122 (at the pivotable end 116) having a pivot point 117, which in turn drives a moveable roller 182 along an arcuate path A. Of course, other configuration of driving the moveable roller may be used. The use of the pneumatic actuator 112 having two cylinders 118 capable of extending and retracting simplifies the system, as described in more detail below. While the present invention illustrates the sorter 100 as using two pneumatic actuators 112, and therefore two load roller drive mechanisms 150, the present invention could be implemented with a single load roller drive mechanism 150 having a single pneumatic actuator 112. One advantage to using two drive mechanisms 150 is that power may be transferred through the O-ring drive belts 168 to both sides of the load rollers 102, thereby limiting slippage of the O-ring drive belts 168 relative to the drive rollers 160 and the load rollers 102, as the load rollers 102 quickly increase in rotation speed, decrease in rotational speed, or even change rotational direction. Even if a single load roller drive mechanism 150 is used, each load roller 102 could still be driven at each end with the O-ring drive belts 168 by using a transfer roller (not illustrated). The transfer roller would be placed at one end of the sorter 100, opposite the upper and lower drive rollers 162, 164 at the other end of the sorter 100, and connected via a belt (not illustrated), such as a micro V-groove belt to one of the drive rollers 150 at the other end. The upper or lower drive rollers 162, 164 coupled to the transfer roller via the belt rotates the transfer roller and as such, the transfer roller receives its drive indirectly from the individual narrow belts passing over one of the upper or lower drive rollers.

Figure 6:
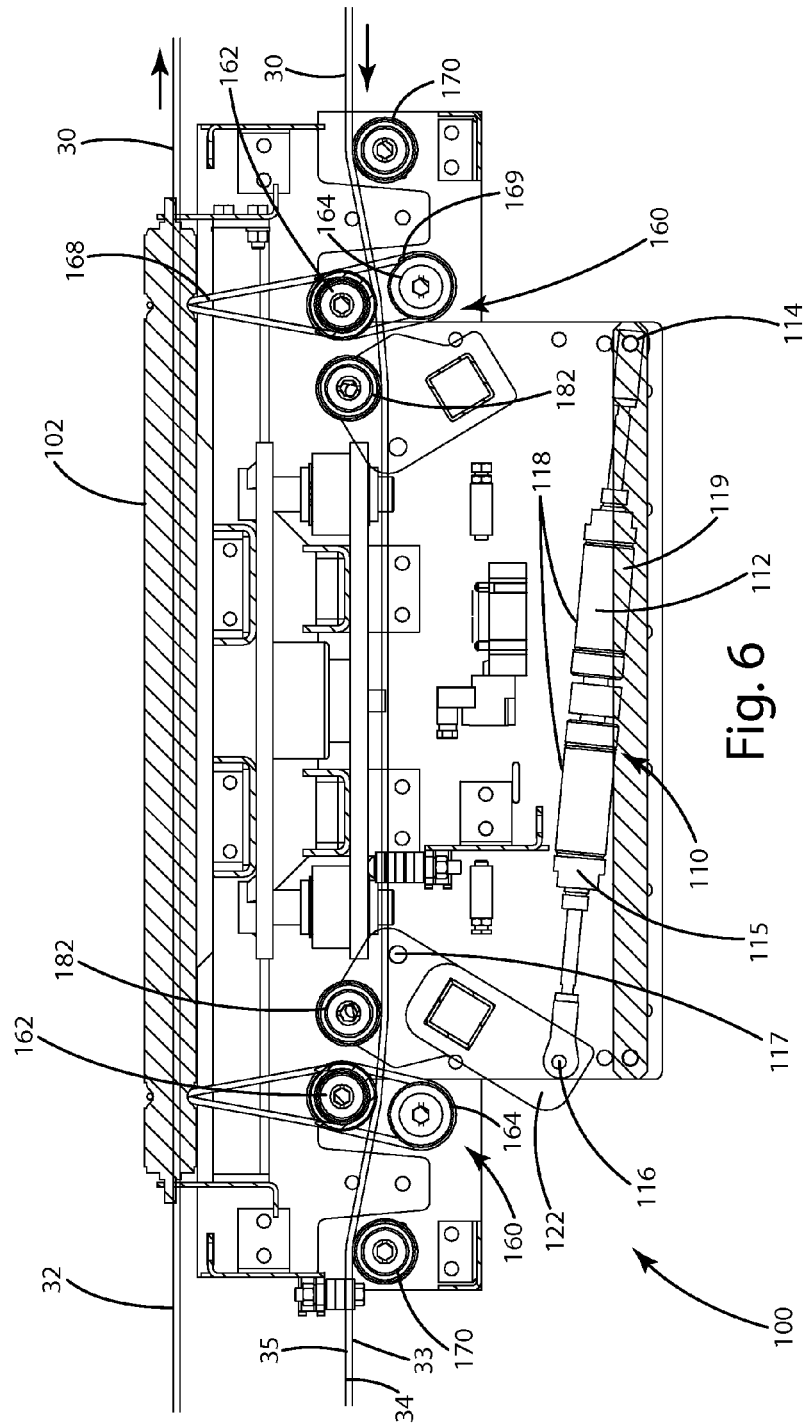
FIG. 6 is a sectional view of the sorter along lines A-A in FIG. 5 with the belt engaged against the upper drive roller.
Figure 7:
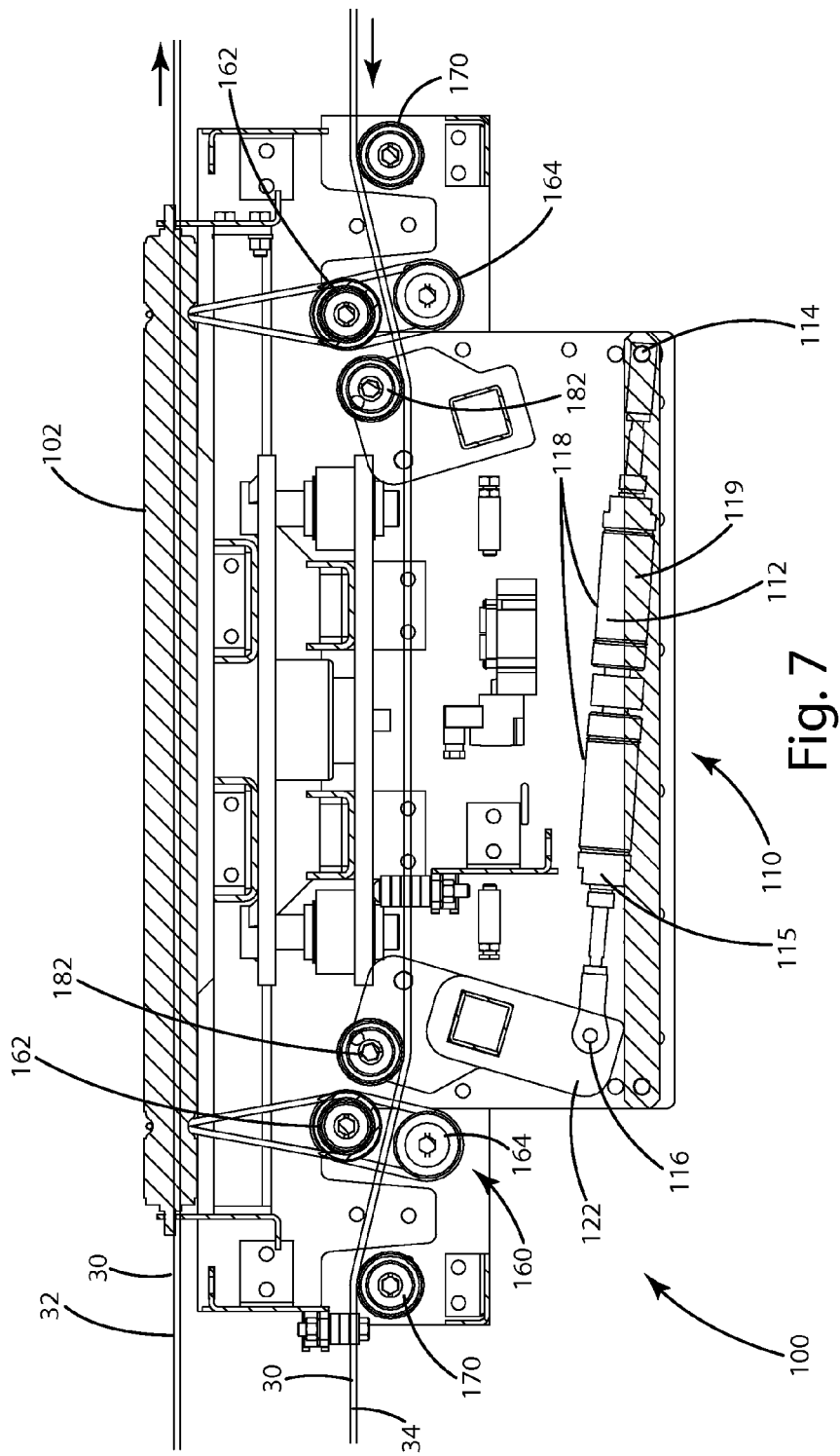
FIG. 7 is a sectional view of the sorter along lines A-A in FIG. 5 with the belts in a neutral position, not engaging either the upper or lower drive rollers.
Figure 8:
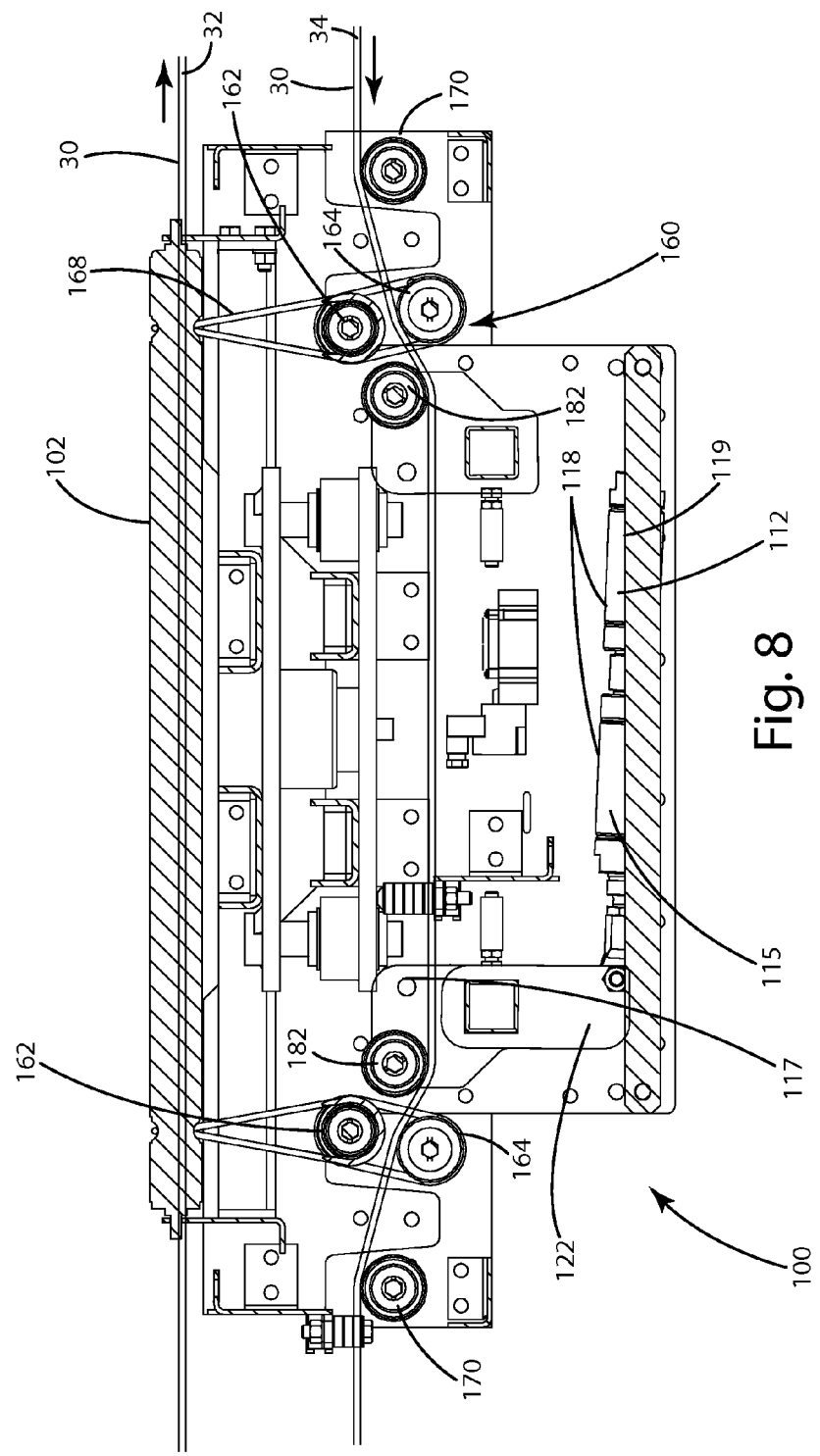
FIG. 8 is a sectional view of the sorter along lines A-A in FIG. 5 with the belts engaging the lower drive roller.

FIGS. 6-8 illustrate the exemplary narrow belt 30 paths 36, and how selectively engaging different drive rollers 160 allows the sorter 100 to provide the dual directional rotation capabilities to the load rollers 102. It is important to note that the present invention is configured to allow the sorter 100 to easily drive the load rollers 102 in a first direction or a second direction using a narrow belts 30 of the primary conveyor segment 12, specifically the return belts or return belt portions 34 which is traveling in a single direction, without the need for any electrical drive motors within the sorter 100. As such, the sorter 100 is very cost-effective to manufacture, and has reduced installation, maintenance and reconfiguration costs.

There are two primary configurations of drive rollers 160 illustrated in the Figures. FIGS. 6-8 use a configuration where the load rollers are individually driven by one of an upper and lower drive rollers. The upper and lower drive rollers are typically interconnected, and the load rollers are only connected directly to one of the upper and lower drive rollers, although other configurations may be used. As further illustrated in FIGS. 11-13, and discussed in more detail below, the present invention may also use an intermediary drive roller 166 operationally located between the load rollers 102 and the upper and lower drive rollers 162, 164.

The return belts 34 of the narrow belts 30 passing through the sorter 102 will pass over a neutral roller 170, which aligns the belts 30, 34 in the desired position. More specifically, the neutral roller 170, is illustrated in FIGS. 6-8 and 11-13 positions the belts entering the sorter so that when the moveable roller 182 changes position, the narrow belts 30, 34 are properly aligned and engaged with either the upper drive roller 162 or lower drive rollers 184, or neither of the drive rollers 162, 184 as illustrated in FIG. 7. More specifically, as the return belts 34 of the narrow belts 30 may vary in position relative to the carrier belts 32, depending upon the conveyor system 10 and other factors, the neutral roller 170 aligns the return belts 34 of the narrow belts 30 relative to the sorter 102 to standardize the position of the narrow belts 30 entering the sorter 100. More specifically, the neutral roller 170 allows variance in the relative vertical position of the sorter 100 or original position of the return belts 34 relative to the carrier belts 32. More specifically, this allows the sorter 100 to be adjusted solely for the height of the load rollers 102 relative to the carrier belts 32 of the narrow belts 30. The neutral roller 170 is illustrated as being under the return belts, but may be on the opposing side. Also, a pair of neutral rollers may be used on each side of the return segments of the narrow belts.

After passing over the neutral roller 170, the return belts 34 pass between the lower drive roller 164 and upper drive roller 162. Depending upon the position of the moveable roller 82, the return belts 34 would engage either the upper drive roller 162 or the lower drive roller 164, or in some cases, in a neutral position such as when the load rollers 102 are not rotating, neither of the upper or lower drive rollers 162, 164. Of course, the present invention can be configured without the neutral position with the load rollers 102 always moving in at least one direction. The present invention shows at least two load roller drive systems 150, each including the cams 122, pneumatic actuators 112, moveable rollers 182, upper drive rollers 162, lower drive rollers 164, and neutral rollers 170. Of course, as discussed above, the sorter 100 could use only a single load roller drive mechanism.

After the return belts 34 pass over the neutral roller 170 and between the upper and lower drive rollers 162, 164, they pass over or by the moveable roller 182 attached to the cam 122, depending on the position of the moveable roller 182. The moveable roller 182 is used to position the return belts 34 of the narrow belts 30 relative to the upper and lower drive rollers 162, 164, and more specifically to cause the return belts 34 to selectively engage one of the upper and lower drive rollers 162, 164. As such, the moveable roller 182 solely positions the narrow belts relative to the neutral roller 170.

As illustrated in FIG. 6, the pneumatic actuators 112, which include two cylinders 118 in the illustrated example, have both cylinders 118 fully extended at both ends, particularly at a fixed cylinder 118 and pivotable cylinder 118, such that the moveable roller 182 is at its highest position to allow the narrow belts 30 to engage the upper drive roller 162. As the moveable roller 182 moves vertically upward, or upward in an arcuate path, relative to the neutral roller 170, the natural tension of the narrow belts 30, specifically the return belts 34, causes the return belts 34 to engage the upper drive roller 162. Although the path of the moveable roller 182 is generally described as arcuate, in some embodiments, it may be vertical movement, driven by an actuator along a slide, or other mechanism. Any type of movement of the moveable roller 182 may occur, so long as it is capable of driving the belts 34 into and out of engagement with the drive rollers 162, 164. In some embodiments, it is possible with the moveable roller 182 in the fully extended position, that the return belts 34 would not engage the neutral roller 170 or moveable roller 182, but only the upper drive roller 162. This lack of engagement with the neutral roller 170 and moveable roller 182 is acceptable, because it is desirable for the upper drive roller 162 to maximize frictional engagement with the belts 34. However, in the illustrated examples, if a line was drawn from the top of one neutral roller 170 to the top of the opposing neutral roller 170, the upper drive rollers 162 would be shown to vertically overlap the position of the neutral rollers 170 in the sorter 102, even though they are horizontally displaced from the neutral rollers 170. Therefore, in the illustrated examples, as illustrated in FIG. 6, the return belts 34 will always engage the neutral roller 170. More specifically, because the upper drive roller 162 and neutral roller 170 are aligned such that they vertically overlap, the narrow belts 30 if not depressed by the moveable roller 182 is forced to engage both the neutral rollers 170 and the upper drive rollers 162.

As illustrated in FIG. 6, given the direction of travel of the return belts 34 through the sorter 100, the upper drive rollers 162 are spun in a clockwise direction. More specifically, the moveable roller coupled to a cam is positioned so that the return belts of the narrow belts engage the upper drive roller to drive the drive rollers in a clockwise direction. As further shown in FIG. 6, the cams 122 and pneumatic actuators 112 of the pneumatic system 110 are driven to a fully extended position such that the moveable roller 182 attached to the cams 122 is either disengaged from the return belts 34 of the narrow belts 30 or at most applying minimal pressure. It is preferable for the return belts 34 of the narrow belts 30 to be fully engaged against the upper drive roller 162, with the moveable roller 182 applying as little pressure as possible to maximize the frictional engagement between the return belts 34 of the narrow belts 30 and the upper drive roller 162. In the example in FIG. 6, the individual upper and lower drive rollers 162, 164 are coupled operationally together with a secondary O-ring drive belt 169 or some other type of belt, so that they rotate in the same direction. As illustrated in FIGS. 6-8, the upper and lower drive rollers are coupled together with a secondary O-ring drive belt 169, although any other configuration may be used. Therefore, as illustrated in FIG. 6, the upper and lower drive rollers 162, 164 are both spun in the clockwise direction when the return belt portion 34 engages the lower side of the upper drive roller 162. The amount of force applied by the moveable roller 182 may vary, depending on what side the return segments 34 is engaging the drive rollers 162, 164.

Figure 11:
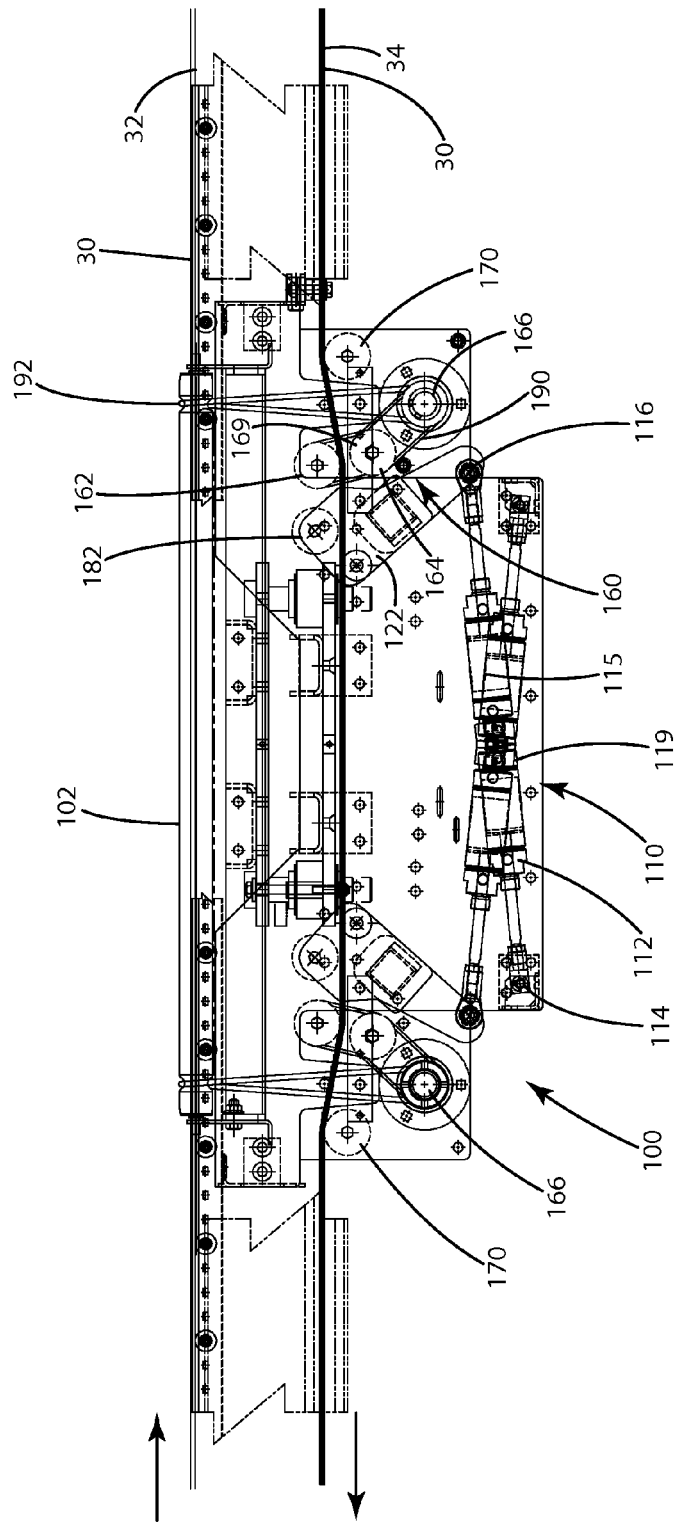
FIG. 11 is a sectional view of the sorter along lines A-A in FIG. 5 and including an intermediary drive roller with the belts engaged against the upper drive roller.

FIGS. 7 and 11 illustrate the upper and lower drive rollers 162, 164 in a neutral position and not being driven by the return belts 34 of the narrow belts 30. More specifically, in the neutral position, the return belts 34 pass through the sorter 100, only touching the neutral roller 170 and moveable roller 182. The return belts 34 of the narrow belts 30 pass between and do not engage either the upper drive rollers 182 or lower drive rollers 164, such that the load rollers 102 are stationary. As illustrated in FIGS. 7 and 11, one of the cylinders 118 of each of the pneumatic actuators 112 is extended while the other is retracted, putting the pneumatic actuator 112, the cam 122, and the moveable roller 182 in their intermediate position or neutral position.

FIG. 8 illustrates the return belts 34 of the narrow belts 30 engaging the lower drive roller 164 to spin the lower and upper drive rollers 162, 164 in a counterclockwise direction, in view of the direction of travel of the return belts through the sorter. As may be clearly seen when FIGS. 6 and 8 are compared, the drive rollers 160 spin in opposite directions in FIGS. 6 and 8, and as such, they would spin the load rollers 102 in opposite directions, assuming the O-ring belt 168 is arranged in an identical fashion between the load rollers 102 and the drive or intermediary rollers 160, 166. The pneumatic actuators 112 in FIG. 8 are illustrated as being fully retracted, specifically that both cylinders 118 are fully retracted, driving the cam 122 and the attached moveable roller 182 to its lowest position relative to the neutral roller 170, and thereby forcing the return belts 34 to engage the lower drive roller 164. Return belts 34 passing through the sorter 100 would pass over a neutral roller 170 across the lower drive roller 164 and past the moveable roller 182 through the sorter 100 and out the other side in the opposite order. Therefore, the sorter 100 causes the return belts 34 to selectively engage the desired upper or lower drive roller 162, 164 to provide the two-directional or reversible spinning of the load rollers 102, even though the return belts 34 providing power are traveling in a single unchanged direction. This directional rotation of the load rollers 102 allows the sorter 100 to sort the loads 8 on the conveyor system 10 to an adjacent segment 13 on either side of the primary segment 12. The sorter 100 may also include the neutral position, as described above with the return belts 34 not engaging either of the upper and lower drive rollers 162, 164. If a neutral position was not needed, a simpler pneumatic actuator 112 may be used, with a single cylinder to drive the cam 122 between the fully extended position in FIGS. 6 and 11 and the fully retracted position in FIGS. 8 and 13.

Figure 10:
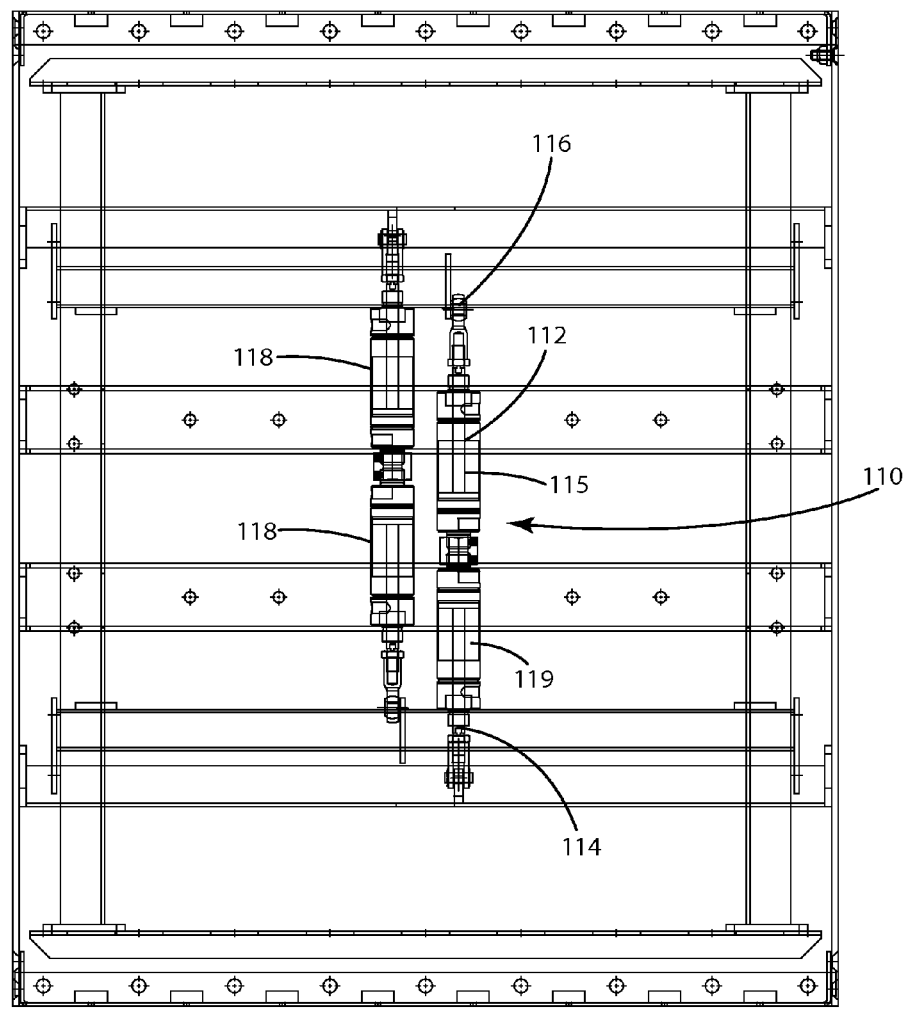
FIG. 10 is a sectional view of the sorter along lines B-B in FIG. 5.

FIG. 10 illustrates a bottom view of the sorter with the pneumatic actuators having each cylinder 118 fully retracted. While it is preferred for the load rollers 102 to raise and lower relative to the drive rollers 160, as illustrated in the Figures, in some configurations, the whole sorter may raise and lower relative to the frames 20.

Figure 12:
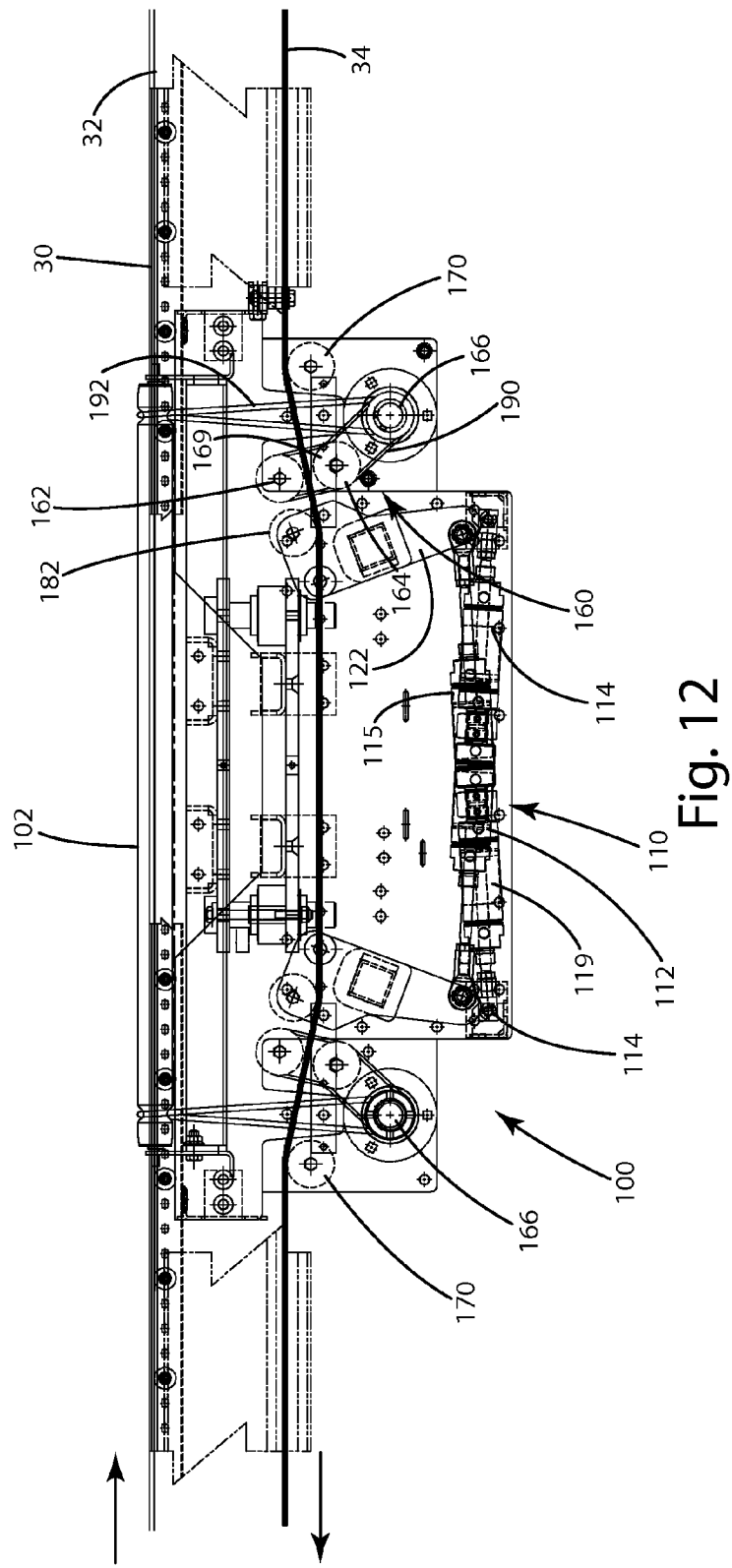
FIG. 12 is a sectional view of the sorter along lines A-A in FIG. 5, including an intermediary drive roller with the belts in the neutral position.
Figure 13:
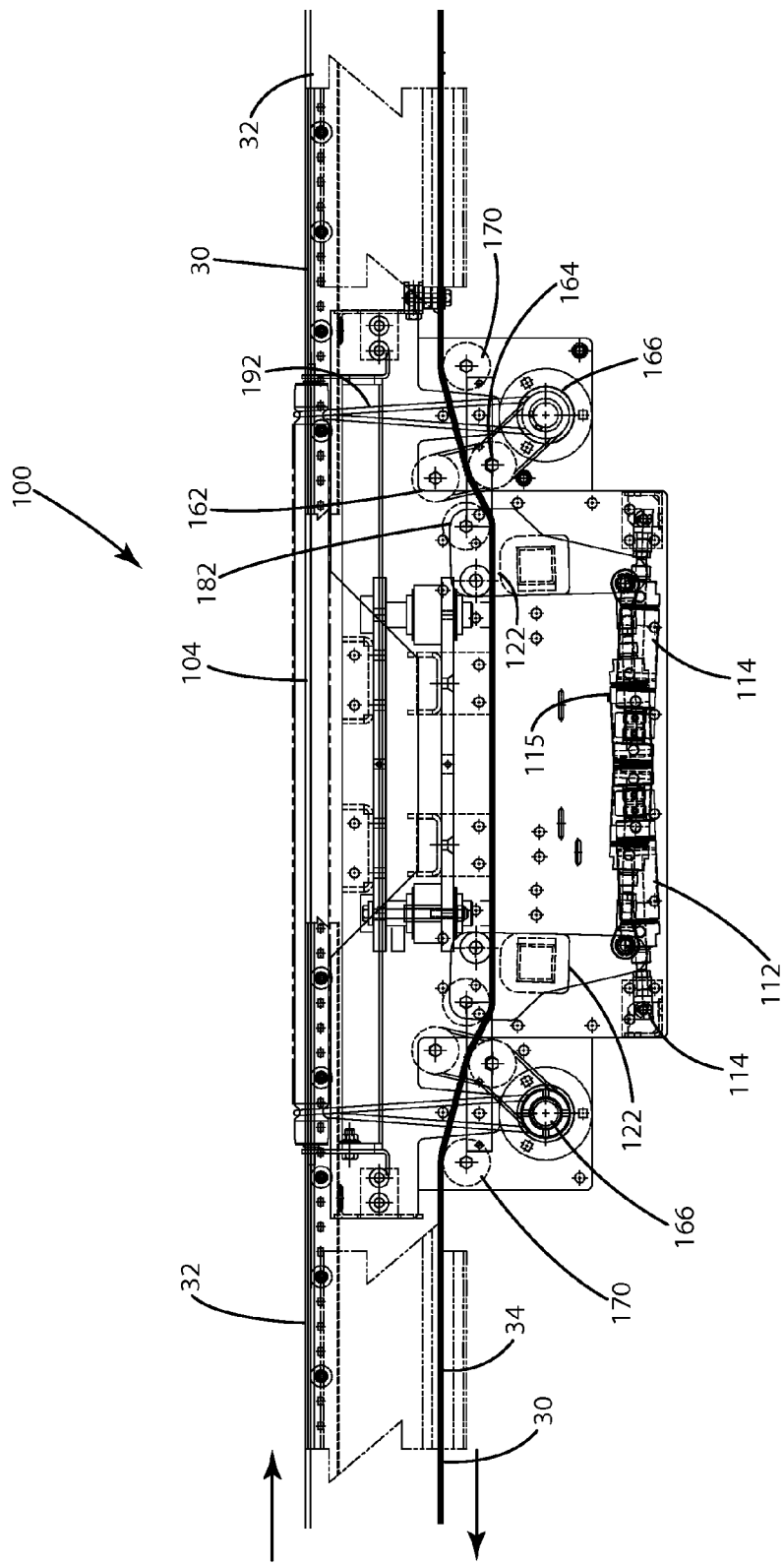
FIG. 13 is a sectional view of the sorter in FIG. 5 along lines A-A including an intermediary drive roller with the belts engaged against the lower roller.

FIGS. 11-13 specifically illustrate a sorter 102 including an additional intermediary drive roller 166. The intermediary drive roller 166 may be configured as a drive roller with internal bearings, a rotatable shaft engaging bearings fixed to the frame, and a fixed shaft having pulleys capable for freely rotating about the shaft, or any combination thereof. This intermediary drive roller 166 allows the O-ring drive belt 192 coupled to the load rollers 102 to be stretched further relative to the load rollers 102, thereby limiting jumping of the O-ring 192 when the load rollers 102 change direction and a more efficient drive of the load rollers 102. As illustrated in FIGS. 6-8, the load rollers 102 may be directly coupled to the lower drive roller or upper drive roller 162, 164, preferably the lower drive roller 164. In FIGS. 11-13, the O-ring drive belt 192 extends from the load rollers 102 to the intermediary drive roller 190, which is positioned below the lower drive roller 164. Typically, as the return belts travel path is fixed, there is little room for changing the position of the upper and lower drive rollers 162, 164. More specifically, while the neutral roller 170 and moveable roller 182 work in conjunction to provide placement of the individual narrow belts 30 passing through the sorter 100, there is a limit to which the narrow belts 30 may be bent relative to its adjacent segment without putting undesirable wear on the narrow belts 30, as well as drag on the main drive. Therefore, adding the intermediary drive roller 166 allows freedom in positioning the drive rollers 160 within the sorter. The intermediary drive roller 166 that drives the load rollers 102 allows for a greater distance to be placed between the load rollers 102 and the intermediary drive roller 166 to which the O-ring 192 is engaged for more efficient power transfer.

As illustrated in FIG. 11, a drive belt, such as a micro V-groove drive belt 109', interconnects the upper and lower drive rollers 102, 104, similar to the O-ring 109 coupling the upper and lower drive rollers 162, 164 in FIGS. 6-8. However, an additional drive belt or intermediary drive belt 190 such as a micro V-groove drive belt 169 is used to couple the lower drive roller 164 to the intermediary drive roller 166 to spin all three drive rollers 160 in the same direction of rotation. Of course, the upper drive roller 162, lower drive roller 164, and intermediary drive roller 166 may be driven by a single belt, when used in conjunction with at least one extra pulley, similar to a serpentine belt used in many engines. The upper and lower drive rollers 162, 164 may also be individually coupled to the intermediary drive roller 166 by separate drive belts.

FIG. 11 illustrates the pneumatic actuators 112 with both the fixed and pivotable cylinders 119, 115 extended. The pneumatic actuators 112 allow easy positioning of the cam 122 and moveable roller 182. More specifically, by using a two cylinder pneumatic actuator 121 coupled to an adjacent cam 122, the amount of movement of the moveable roller 182 relative to the pivot point 117 of the cam 122 is fixed, and it eliminates the possibility of a cylinder having an infinite number of positions and from getting misaligned. Therefore, the sorter 102 of the present invention allows a binary on/off actuation, which simplifies the system 10 and ensures accurate easy operation. The binary action of the pneumatic cylinders 112 allows the sorter 100 to index the position of the moveable roller 182 without any need to measure or adjust the position of the roller 182 to determine that it is properly positioned. So long as the pneumatic cylinder 112 is capable of fully retracting and fully extending selectively using both cylinders 118 independently, the moveable roller 182 is easily and accurately positioned in one of three positions. As illustrated in FIG. 11, both cylinders 119, 115 are fully extended so that the moveable roller 182 is at its highest position, allowing the return belts 34 of the narrow belts 30 to fully engage and drive the upper drive roller 164.

As illustrated in FIG. 12, the sorter is in a neutral position wherein the return belts 34 of the narrow belts 30 passing through the sorter 100 engages neither of the upper or lower drive rollers 162, 164, placing all drive rollers 160 in a stationary condition. Of course, the neutral roller 170 and moveable roller 182 may engage the belts. As illustrated in FIG. 12, the pneumatic actuators 112 are configured such that one cylinder 118, illustrated as the fixed cylinder 119, is retracted while the other cylinder 118, illustrated as the pivotable cylinder 115, is extended to place the cam 122 in its intermediary position. In FIG. 12 the pneumatic cylinder 112 has the fixed cylinder 118 retracted while the pivot cylinder 115 is extended.

As further illustrated in FIG. 13, the pneumatic actuators 112, specifically the cylinders 118, are both fully retracted, moving the cam 122 to a position where the moveable roller 182 is in its lowest position relative to the drive rollers 162, 164. As such, the return belts 34 of the narrow belts 30 pass over and engage the lower drive roller 164, spinning the three drive rollers 160 in a counterclockwise direction. Again, when comparing FIGS. 11 and 13, by simply moving the position of the moveable roller 182 to force the return belts 34 of the narrow belts 30 to engage either of the upper or lower drive rollers 162, 164, the sorter 100 is able to spin the load rollers 102 in opposite directions. Therefore, the return belts 34 of a narrow belts 30 moving in a single direction of travel may be used by the sorter 100 to spin the load rollers 102 in either direction, without the use of electrical motors in the sorter 100 to power the load rollers 102. In the illustrated embodiment, four to eight belts are used, although any number of belts may be used depending on the desired configuration and each of these belts 30 would in turn engage the rollers 162, 164, 170, 182 as illustrated with the singular belt shown in the section views of the various Figures.

Figure 14:
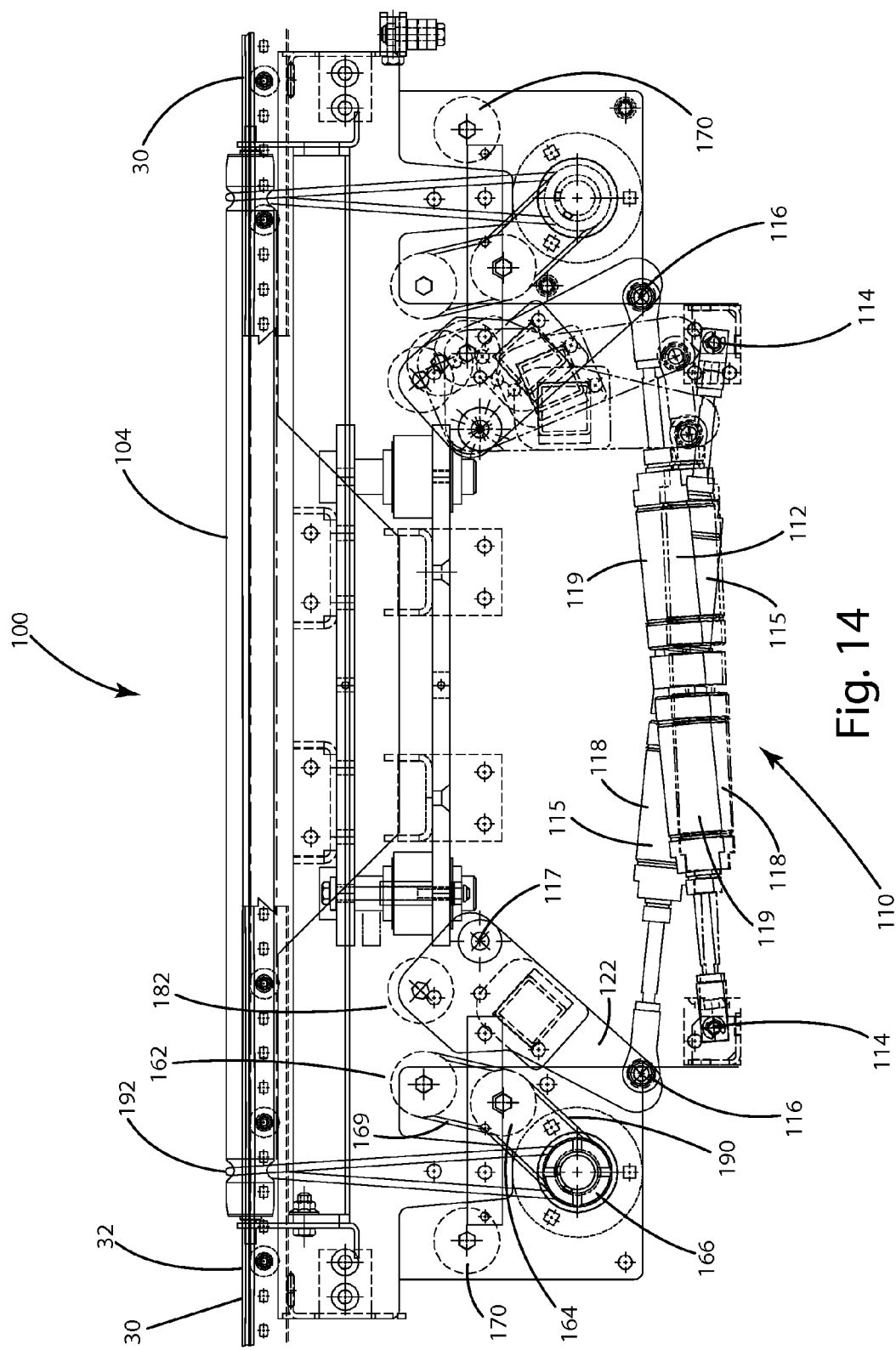
FIG. 14 is a sectional view along lines A-A in FIG. 5 showing the moveable roller in its three positions.

FIG. 14 illustrates the cam 122 and pneumatic actuator 112, as well as the moveable roller 182, in the three different positions, specifically first position where the return belts 34 would engage the upper drive roller 162, a second position where the return belts 34 would be between the drive rollers 162, 164 and not engaging either the lower or upper drive roller 162, 164, and a third position wherein the return belts 34 would engage the lower drive roller 164.

Figure 15:
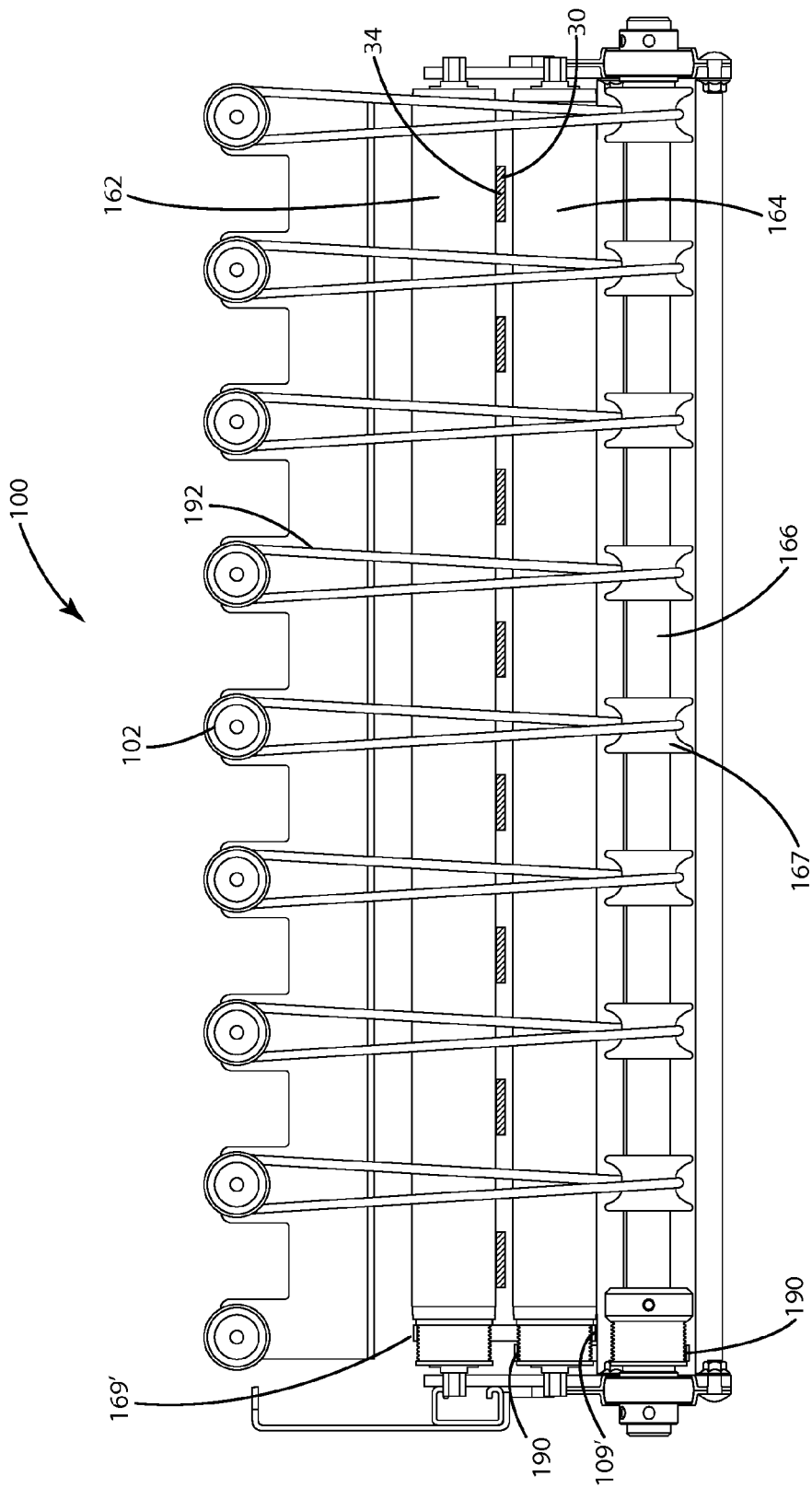
FIG. 15 is a partial sectional view along lines C-C in FIG. 1 of the conveyor system and sorter, including an intermediary drive roller.
Figure 16:
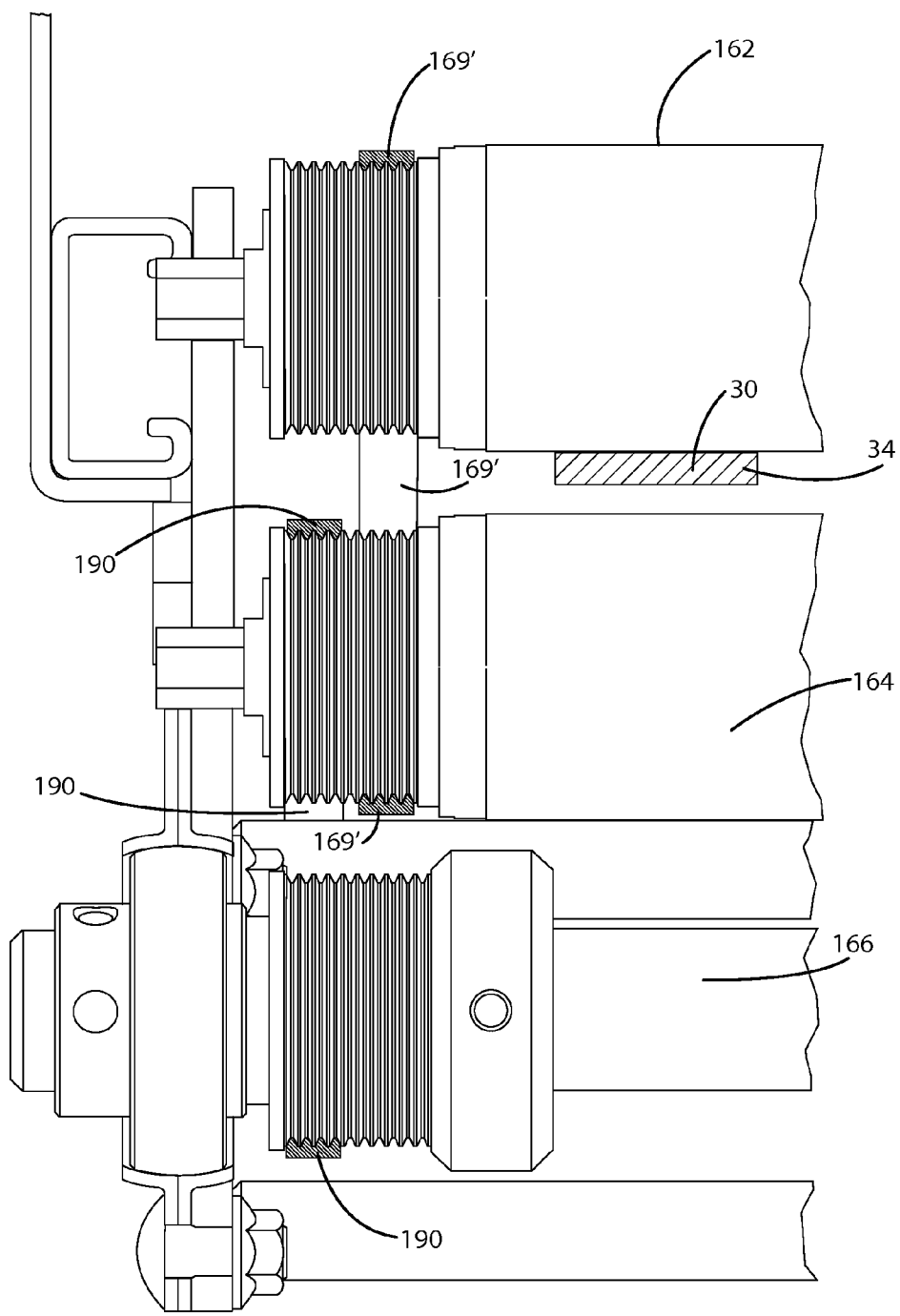
FIG. 16 is an enlarged partial sectional view along line C-C in FIG. 4 showing the belt engaged against the upper drive roller.
Figure 17:
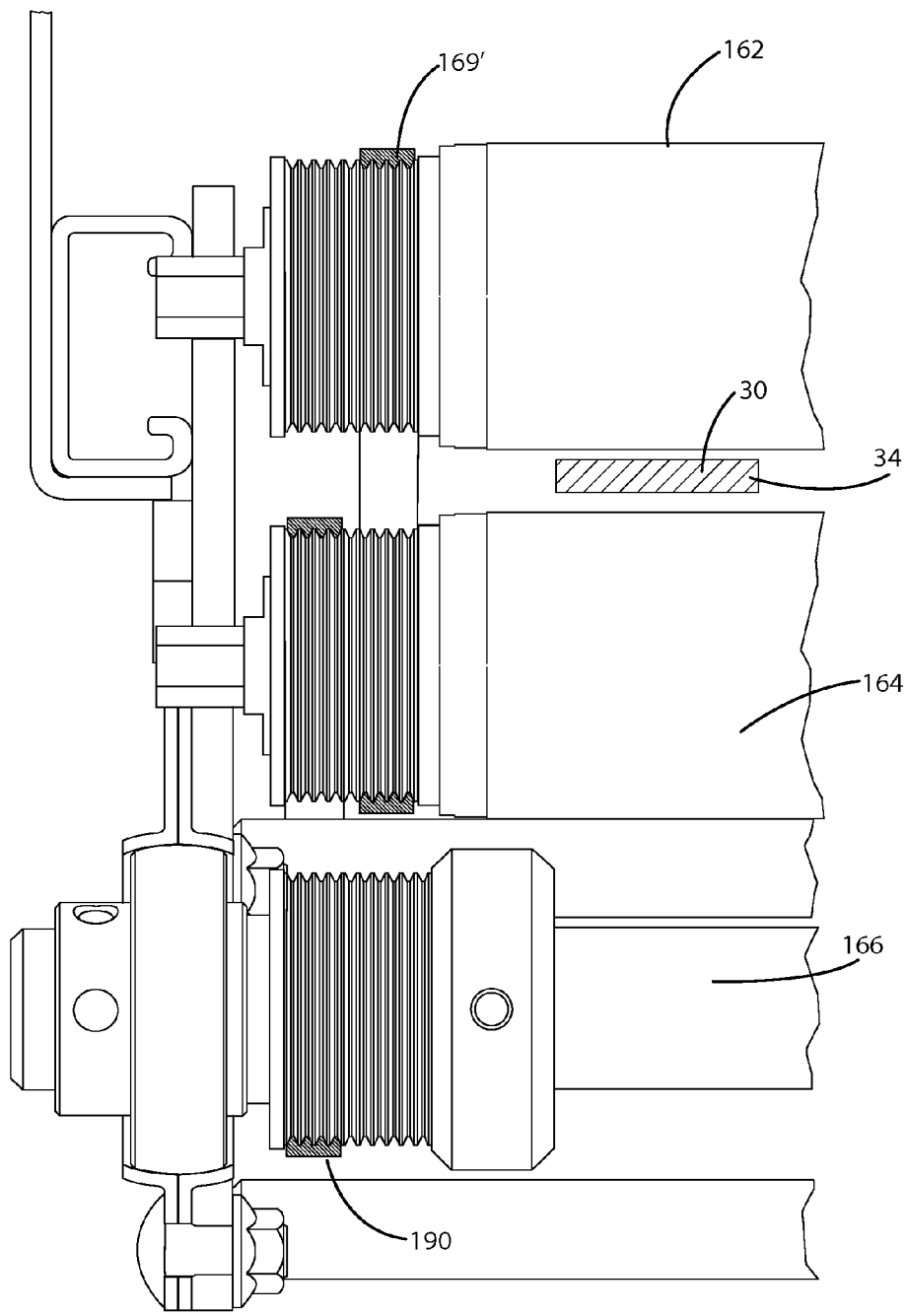
FIG. 17 is an enlarged partial sectional view along line C-C in FIG. 4 showing the belt in the neutral position.
Figure 18:
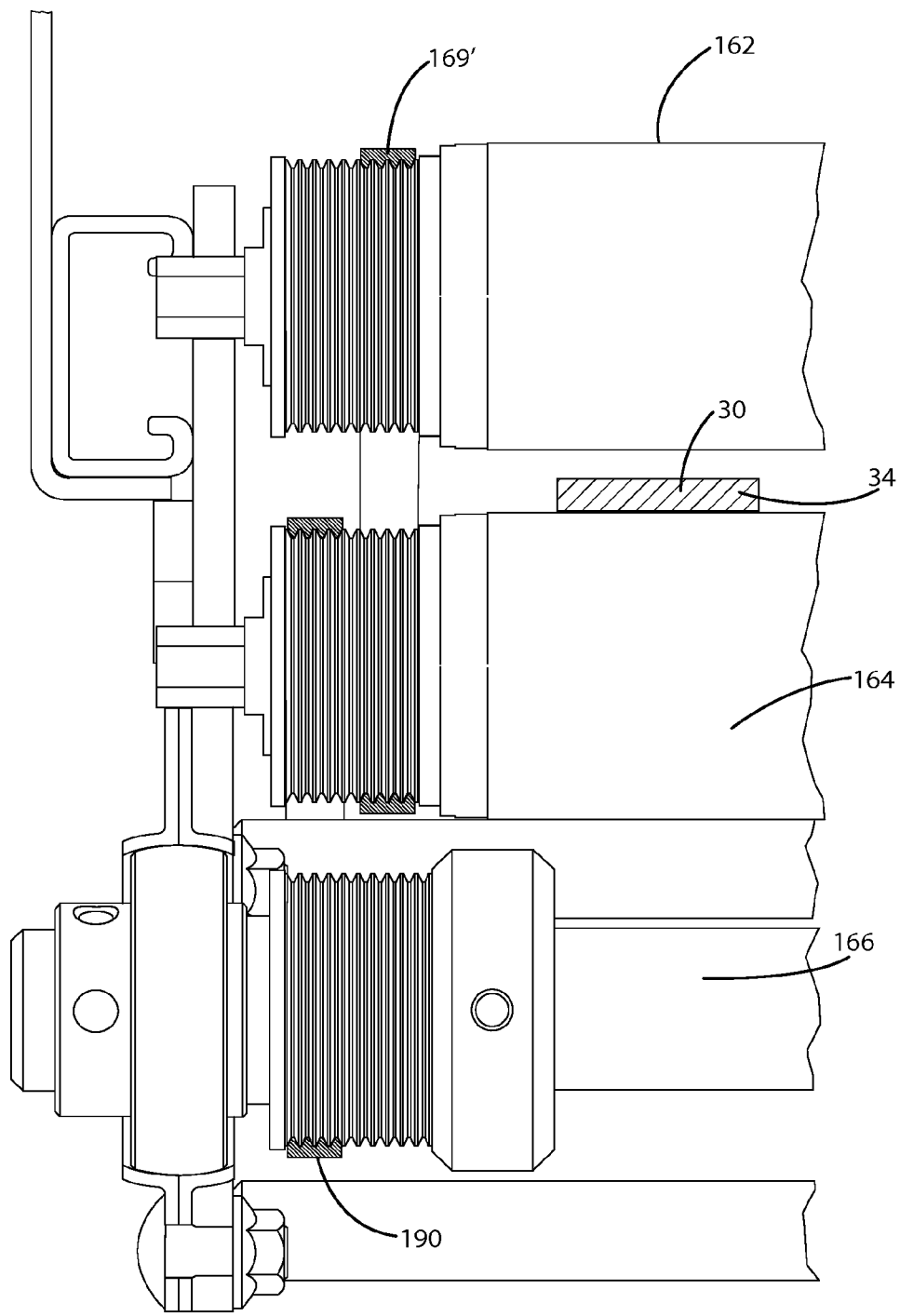
FIG. 18 is an enlarged partial sectional view along line C-C in FIG. 4 showing the belt engaged against the lower drive roller.
Figure 19:
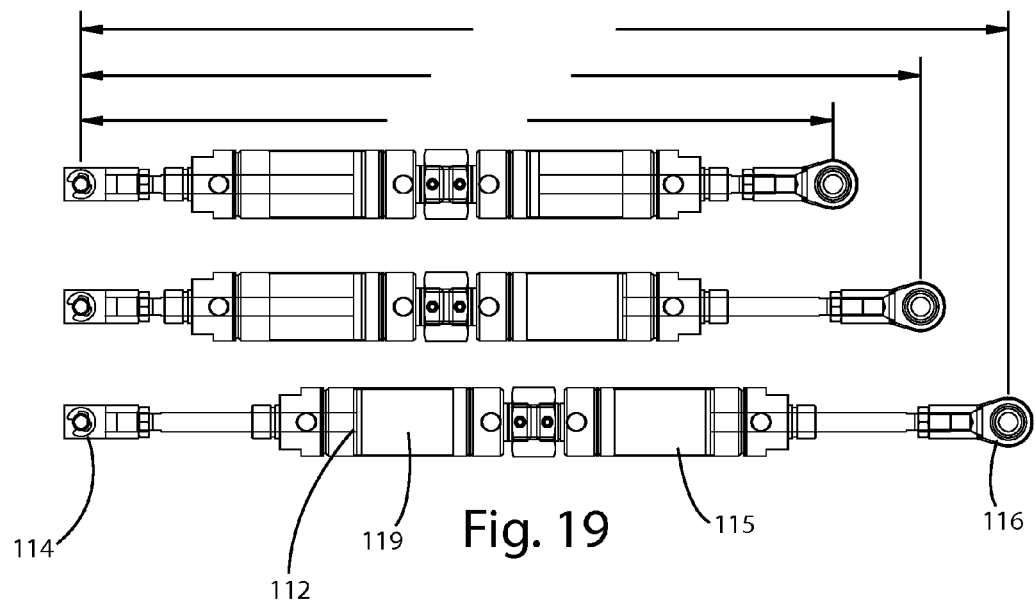
FIG. 19 illustrates the three positions of the pneumatic actuators.
Figure 20:
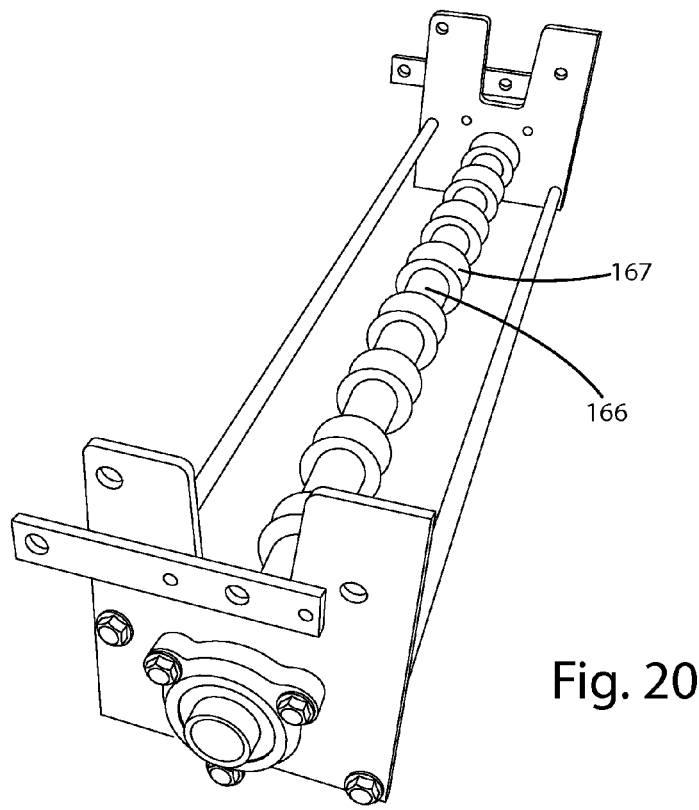
FIG. 20 is a front perspective view of an intermediary drive roller.

FIG. 15 further illustrates the positions of the upper drive roller 162, lower drive roller 164, and intermediary drive roller 166, as well as the drive belt 169' that connects both the upper and lower drive rollers 162, 164 together, and the second drive belt 190 that couples the lower drive roller 164 and intermediary drive roller 166 together. As may be further seen in FIG. 15, the O-ring drive belt extends across the pulley 167 on the intermediary drive roller 166 and up to the load rollers 102. The drive belt configuration in FIG. 15 is only exemplary and it could be configured where each of the lower drive roller 164 and upper drive roller 162 extend directly to the intermediary drive roller 170. As further illustrated in FIG. 15, the individual drive belts are expected to be micro V-groove belts. FIGS. 15-20 further show the drive belt paths. FIGS. 15 and 16 more specifically shows the narrow belts 30 engaged with the upper drive roller 102, while FIG. 17 illustrates the narrow belts 30 passing between the upper drive roller 162 and lower drive roller 164. FIG. 18 illustrates the narrow belts 30 lower drive roller 164. FIG. 19 shows the various positions of the pneumatic actuator 112 with the cylinders 118 in the extended or retracted positions. FIG. 20 illustrates a perspective view of the intermediary drive roller. The O-rings may extend up to the load rollers 102 and transfer drive from the intermediary drive roller 166, specifically the pulleys 167, to the load rollers 102.

FIG. 21 illustrates a top perspective view of a sorter 100 including drive wheels 104 in place of the load rollers 102. Although not illustrated, a second intermediary roller may be used to drive all of the wheels in a particular row, with the second intermediary roller being operationally coupled to the intermediary drive roller.

The invention claimed is:

1. A sorter for a narrow belt conveyor system having at least one narrow belt including a return belt portion and a carrier belt portion, the sorter comprising:
   at least one of a plurality of rollers and a plurality of wheels;
   at least one drive roller and wherein the at least one drive roller is configured to be selectively driven by the return belt portion; and
   at least one drive belt operationally coupling the at least one drive roller to the at least one of the plurality of rollers and the plurality of wheels.

2. The sorter of claim 1 wherein the at least one drive belt extends between the at least one drive roller and the at least one of the plurality of rollers and the plurality of wheels.

3. The sorter of claim 1 further including an intermediary roller and wherein the at least one drive belt includes at least one of a first drive belt extending between the at least one drive roller and the intermediary roller and an intermediary drive belt extending between the intermediary roller and the at least one of the plurality of rollers and the plurality of wheels.

4. The sorter of claim 1 further including a pneumatic system having a moveable roller configured to move between at least a first position and a neutral position and wherein when the moveable roller is in the first position the at least one drive roller is configured to engage the return belt portion, and when the moveable roller is in the neutral position the at least one drive roller is free of engagement with the return belt portion.

5. The sorter of claim 1 wherein the at least one drive roller includes at least one upper drive roller and at least one lower drive roller.

6. The sorter of claim 5 further including an inter-drive belt operationally coupling the at least one upper drive roller and the at least one lower drive roller together to rotate in the same rotational direction.

7. The sorter of claim 6 further including at least one intermediary roller and wherein at least one of the at least one upper drive roller and the at least one lower drive roller is directly coupled to the at least one intermediary roller with a first drive belt.

8. The sorter of claim 7 wherein the at least one intermediary roller is coupled to the at least one of the plurality of rollers and the plurality of wheels with at least one intermediary drive belt.

9. The sorter of claim 1 further including a pneumatic system having a moveable roller configured to move between at least a first position, a neutral position, and a second position, and wherein the at least one drive roller includes at least one upper drive roller and at least one lower drive roller, and the moveable roller is configured to move the return belt selectively into engagement with the at least one upper drive roller to move the at least one of a plurality of load rollers and a plurality of wheels in a first direction; between the rollers and free from engaging the at least one upper drive roller and the at least one lower drive roller in a neutral position and into engagement with the at least one lower drive roller to move the at least one of a plurality of load rollers and a plurality of wheels in a second direction and wherein the first direction is opposite the second direction.

10. The sorter of claim 1 further including a pneumatic system capable of moving a moveable roller between a first position, a neutral position and a second position, and wherein the neutral position is between the first position and the second position and wherein the pneumatic system includes at least one pneumatic actuator.

11. The sorter of claim 10 wherein the at least one pneumatic actuator has a three position binary movement using a fixed cylinder at an opposing end from a pivotable cylinder and wherein each of the fixed cylinder and the pivotable cylinder are capable of moving between a retracted position and an extended position.

12. The sorter of claim 11 wherein the fixed cylinder is fixedly secured to the sorter and the pivotable cylinder is operationally coupled to the moveable roller to move the moveable roller between the first position, the neutral position, and the second position.

13. The sorter of claim 12 and wherein in the first position both of the fixed and pivotable cylinders are in the retracted position, in the neutral position one of the fixed and pivotable cylinders is in the retracted position and the other of the fixed and pivotable cylinders is extended and in the second position both of the pivotable and fixed cylinders are in the extended position.

14. The sorter of claim 10 further including a neutral roller wherein in the first position the neutral roller does not engage the return belt and the return belt engages only one of the at least one upper drive roller and the at least one lower drive roller.

15. The sorter of claim 10 wherein in the neutral position the moveable drive roller engages the return belt and wherein each of the at least one upper drive roller and at least one lower drive roller do not engage the return belt.

16. The sorter of claim 10 wherein in the second position the return belt engage the moveable roller and one of the at least one upper drive roller and the at least one lower drive roller.

17. The sorter of claim 10 wherein the pneumatic system further includes a pneumatic actuator and a cam and wherein each of the pneumatic actuator and the moveable roller are coupled to the cam.

18. A narrow belt conveyor system for carrying loads, the system comprising:
at least one narrow belt having a return belt portion and a carrier belt portion;
a sorter and wherein the return belt portion passes through the sorter, the sorter including:
at least one drive roller;
a moveable roller configured to move the return belt portion in and out of engagement with the at least one drive roller;
at least one of a plurality of rollers and a plurality of wheels; and
at least one drive belt operationally coupling the at least one drive roller to the at least one of the plurality or rollers and the plurality of wheels.

19. The narrow belt conveyor system of claim 18 wherein the at least one drive belt extends between the at least one drive roller and the at least one of the plurality of rollers and the plurality of wheels.

20. The narrow belt conveyor system of claim 18 further including an intermediary roller and wherein the at least one drive belt includes at least one of a first drive belt extending between the at least one drive roller and the intermediary roller and an intermediary drive belt extending between the intermediary roller and the at least one of the plurality of rollers and the plurality of wheels.

21. The narrow belt conveyor system of claim 18 wherein the at least one drive roller includes at least one upper drive roller and at least one lower drive roller.

22. The narrow belt conveyor system of claim 21 further including at least one intermediary roller and wherein at least one of the at least one upper drive roller and the at least one lower drive roller is directly coupled to the at least one intermediary roller with a first drive belt.

23. The narrow belt conveyor system of claim 22 wherein at least one of the at least one upper drive roller and the at least one lower drive roller is not directly coupled to the intermediary roller.

24. The narrow belt conveyor system of claim 23 wherein the at least one upper drive roller and the at least one lower drive roller are directly coupled with a second drive belt.

25. The narrow belt conveyor system of claim 22 wherein the at least one intermediary roller is coupled to the at least one of the plurality of rollers and the plurality of wheels.

26. The narrow belt conveyor system of claim 21 wherein the moveable roller is configured to move the return belt selectively into engagement with the at least one upper drive roller to move the at least one of the plurality of load rollers and the plurality of wheels in a first direction; between the rollers and free from engaging the at least one upper drive roller and the at least one lower drive roller in a neutral position; and into engagement with the at least one lower drive roller to move the at least one of the plurality of load rollers and the plurality of wheels in a second direction and wherein the first direction is opposite the second direction.

27. The narrow belt conveyor system of claim 22 wherein the at least one upper drive roller is positioned opposite the at least one lower drive roller with the return belt extending therebetween.

28. The narrow belt conveyor system of claim 27 further including an intermediary roller and wherein the at least one of a plurality of load rollers and a plurality of wheels, and the intermediary roller are located on opposite sides of the at least one upper drive roller and the at least one lower drive roller.

29. The narrow belt conveyor system of claim 18 further including a pneumatic system capable of moving the moveable roller between a first position, a neutral position and a second position, and wherein the neutral position is between the first position and the second position.

30. The narrow belt conveyor system of claim 29 wherein the pneumatic system includes a pneumatic actuator having fixed cylinder at an opposing end from a pivotable cylinder and wherein each of the fixed cylinder and the pivotable cylinder are capable of moving between a retracted position and an extended position and wherein in the first position both of the fixed and pivotable cylinders are in the retracted position, in the neutral position one of the fixed and pivotable cylinders is in the retracted position and the other of the fixed and pivotable cylinders is in the extended position and in the second position both of the pivotable and fixed cylinders are in the extended position.

31. The narrow belt conveyor system of claim 29 wherein the pneumatic system further includes a pneumatic actuator and a cam and wherein each of the pneumatic actuator and the moveable roller are coupled to the cam.

32. The narrow belt conveyor system of claim 18 wherein the moveable roller is configured to move between a first position, a neutral position and a second position and wherein the at least one drive roller includes at least one upper drive roller and at least one lower drive roller.

33. The narrow belt conveyor system of claim 18 wherein in the first position the moveable roller does not engage the return belt and the return belt engages only one of the at least one upper drive roller and the at least one lower drive roller.

34. The narrow belt conveyor system of claim 33 wherein in the neutral position the moveable drive roller engages the return belt and wherein each of the at least one upper drive roller and at least one lower drive roller do not engage the return belt.

35. The narrow belt conveyor system of claim 33 wherein in the second position the return belt engage the moveable roller and one of the at least one upper drive roller and the at least one lower drive roller.

36. The narrow belt conveyor system of claim 18 wherein the carrier belt portion passes over the sorter and wherein the sorter is configured to extend between a retracted position and an extended position and in the retracted position the at least one of the plurality of rollers and the plurality of wheels is below the carrier belt portion and in the extended position, the at least one of the plurality of rollers and the plurality of wheels is at least partially above the carrier belts such that the load engages the at least one of the plurality of rollers and the plurality of wheels and not the carrier belt portion.

37. A sorter for a narrow belt conveyor system having at least one narrow belt including a return belt portion and a carrier belt portion, the sorter comprising:

at least one of a plurality of rollers and a plurality of wheels;

at least upper drive roller and at least one lower drive roller and wherein each the at least one upper drive roller and the at least one lower drive roller is configured to be selectively driven by the return belt portion and wherein the at least one upper roller engaging the return belt portion rotates the at least one of the plurality of rollers and the plurality of wheels in a first direction and the at least one lower drive roller engaging the return belt portion rotates the at least one of the plurality of rollers and the plurality of wheels in a second direction and wherein the first and second directions are opposite, and wherein the sorter is configured to rotate the at least one of a plurality of rollers and a plurality of wheels in the first direction and the second direction without the use of electrical motors in the sorter; and at least one drive belt operationally coupling the at least one drive roller to the at least one of the plurality or rollers and the plurality of wheels.

38. The sorter of claim 37 further including a pneumatic system and a moveable roller and wherein the pneumatic system is configured to move the moveable roller to position the return belt portion in and out of engagement with each of the at least one upper drive roller and the at least one lower drive roller, and wherein when the moveable roller is in a first position the at least one of a plurality of rollers and a plurality of wheels rotates in the second direction and when the moveable roller is in a second position, the at least one of a plurality of rollers and a plurality of wheels rotates in the second direction and wherein the moveable roller also includes a neutral position between the first position and the second position, and a pneumatic system configured to move the moveable roller.

* * * * *